(12) United States Patent
Kawabe et al.

(10) Patent No.: US 12,398,284 B2
(45) Date of Patent: Aug. 26, 2025

(54) AQUEOUS INK, INK JET RECORDING METHOD AND INK JET RECORDING APPARATUS

(71) Applicant: CANON KABUSHIKI KAISHA, Tokyo (JP)

(72) Inventors: Minako Kawabe, Tokyo (JP); Tomohiro Yamashita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 193 days.

(21) Appl. No.: 18/486,483

(22) Filed: Oct. 13, 2023

(65) Prior Publication Data

US 2024/0141194 A1 May 2, 2024

(30) Foreign Application Priority Data

Oct. 18, 2022 (JP) .................... 2022-167231
Sep. 25, 2023 (JP) .................... 2023-160081

(51) Int. Cl.
*C09D 11/38* (2014.01)
*B41J 2/01* (2006.01)

(52) U.S. Cl.
CPC ............... *C09D 11/38* (2013.01); *B41J 2/01* (2013.01)

(58) Field of Classification Search
CPC ....... C09D 11/322; C09D 11/38; C09D 11/30; C09D 11/40; B41J 2/01
See application file for complete search history.

(56) References Cited

U.S. PATENT DOCUMENTS

| 6,419,733 B1 * | 7/2002 | Sano ............... C09D 11/54 106/31.89 |
| 7,749,316 B2 * | 7/2010 | Mizushima ......... C09D 11/38 106/31.6 |

(Continued)

FOREIGN PATENT DOCUMENTS

| JP | H04356570 A | 12/1992 |
| JP | 2002301857 A | 10/2002 |
| JP | 2010155359 A | 7/2010 |

*Primary Examiner* — John P Zimmermann
(74) *Attorney, Agent, or Firm* — Canon U.S.A., Inc. IP Division

(57) ABSTRACT

Provided is an aqueous ink for ink jet, which enables the recording of an image having satisfactory abrasion resistance and has satisfactory storage stability. The aqueous ink for ink jet includes: a wax; a dispersant for dispersing the wax; an ester compound; and a water-soluble organic solvent, wherein the wax is a wax represented by the following general formula (1), and the ester compound is an ester compound represented by the following general formula (2), wherein in the general formula (1), "n" represents an integer of 20 or more to 80 or less, and in the general formula (2), "a" and "b" each independently represent an integer of 1 or more, the integers satisfying 20≤a+b+1≤80, and "c" represents an integer of 10 or more to 40 or less.

14 Claims, 1 Drawing Sheet

$$C_nH_{2n+2} \qquad (1)$$

(2)

(56) References Cited

U.S. PATENT DOCUMENTS

| | | | |
|---|---|---|---|
| 2004/0122109 A1* | 6/2004 | Fujii | A61K 31/122 424/94.1 |
| 2005/0036019 A1* | 2/2005 | Maekawa | C09D 11/30 347/100 |
| 2007/0053855 A1* | 3/2007 | Shelton | A61Q 19/00 424/70.13 |
| 2009/0169765 A1* | 7/2009 | Nakamura | C09D 11/101 522/68 |
| 2015/0116418 A1* | 4/2015 | Oura | D06P 1/48 524/207 |
| 2016/0215154 A1* | 7/2016 | Kawabe | C09D 11/322 |

* cited by examiner

AQUEOUS INK, INK JET RECORDING METHOD AND INK JET RECORDING APPARATUS

BACKGROUND

Field of the Disclosure

The present disclosure relates to an aqueous ink, an ink jet recording method and an ink jet recording apparatus.

Description of the Related Art

In recent years, the frequency at which an ink jet recording apparatus is utilized in the field of office printing or commercial printing has started to increase. In addition, the ink jet recording apparatus has been required to be further increased in recording speed. In addition, the resultant recorded product has been required to have image fastness, in particular, fixability, abrasion resistance and ink storage stability.

Under such circumstances, a technology including adding a wax to an ink to improve its abrasion resistance has been proposed (Japanese Patent Application Laid-Open No. 2010-155359, Japanese Patent Application Laid-Open No. H04-356570 and Japanese Patent Application Laid-Open No. 2002-301857).

The inventors of the present disclosure have evaluated the abrasion resistance and storage stability of an ink having added thereto a wax based on Japanese Patent Application Laid-Open No. 2010-155359, Japanese Patent Application Laid-Open No. H04-356570 and Japanese Patent Application Laid-Open No. 2002-301857. As a result, the inventors have found that although an effect on the abrasion resistance is obtained, the storage stability of the ink involves a problem because when the ink is left to stand still under room temperature (25° C.) or a high-temperature environment, waxes gradually float on the surface of the ink and in severe cases, layer separation due to the aggregation of the waxes is observed.

SUMMARY

Accordingly, an object of the present disclosure is to provide an aqueous ink for ink jet, which enables the recording of an image having satisfactory abrasion resistance and has satisfactory storage stability. In addition, another object of the present disclosure is to provide an ink jet recording method and an ink jet recording apparatus each using the aqueous ink.

That is, according to the present disclosure, there is provided an aqueous ink for ink jet including: a wax; a dispersant for dispersing the wax; an ester compound; and a water-soluble organic solvent, wherein the wax is a wax represented by the following general formula (1), and wherein the ester compound is an ester compound represented by the following general formula (2).

$$C_nH_{2n+2} \quad (1)$$

in the general formula (1), "n" represents an integer of 20 or more to 80 or less.

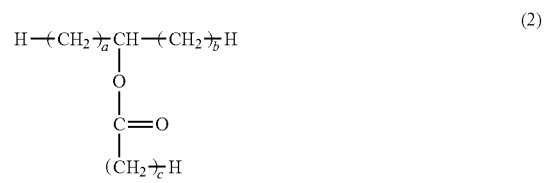

in the general formula (2), "a" and "b" each independently represent an integer of 1 or more, the integers satisfying 20≤a+b+1≤80, and "c" represents an integer of 10 or more to 40 or less.

Further features of the present disclosure will become apparent from the following description of exemplary embodiments with reference to the attached drawings.

DESCRIPTION OF THE EMBODIMENTS

Figure 1:
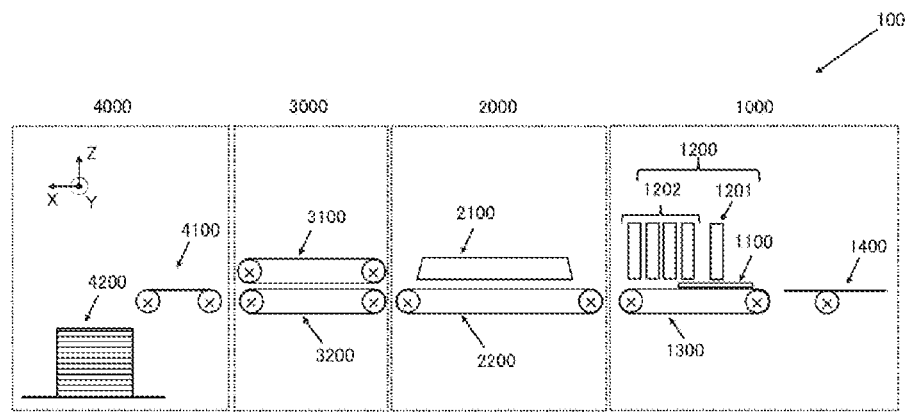
FIG. 1 is a schematic view for illustrating an ink jet recording apparatus according to one embodiment of the present disclosure.

The present disclosure is described in more detail below by way of exemplary embodiments. In the present disclosure, when a compound is a salt, the salt is present as dissociated ions in an ink, but the expression "contain a salt" is used for convenience. In addition, an aqueous ink and reaction liquid for ink jet are sometimes referred to simply as "ink" and "reaction liquid". Physical property values are values at room temperature (25° C.), unless otherwise stated. The descriptions "(meth)acrylic acid" and "(meth)acrylate" refer to "acrylic acid or methacrylic acid" and "acrylate or methacrylate", respectively. In the present disclosure, a "unit" constituting a resin refers to a repeating unit derived from one monomer.

To grasp a cause for the floating of a wax on the surface of an ink due to the still standing of the ink, the inventors of the present disclosure have first left a dispersed body of the wax to stand still under room temperature (25° C.) and environments at 40° C. and 60° C. as accelerated tests. In this case, the floating of the wax and layer separation similar to those occurring in the ink were not observed.

Accordingly, the inventors have found that the floating of the wax and the layer separation are problems occurring when the ink is prepared, in other words, problems caused by combined use of a water-soluble organic solvent to be used in the ink and the wax. A possible cause for the occurrence of the problems by the combined use of the water-soluble organic solvent and the wax is as follows: an adsorption force between a wax and a dispersant for dispersing the wax is weakened by the water-soluble organic solvent to separate the dispersant from the wax, to thereby destabilize the dispersion of the wax. Probably as a result of the foregoing, the wax having a low specific gravity surfaces and floats and furthermore, the waxes are brought into contact with each other to aggregate, to thereby cause the separation.

Even in such an ink that the floating of the wax and the layer separation were observed at the time of its still standing, when the viscosity of the ink and the particle diameter of the wax were measured after the stirring of the ink, the viscosity and the particle diameter did not change as compared to the viscosity of the ink and the particle diameter of the wax before the storage of the ink. In other words, the floating of the wax and the layer separation are problems that cannot be grasped merely by measuring the physical properties of the stored ink after its stirring.

To solve the problems of the floating of the wax and the layer separation, the inventors of the present disclosure have first investigated the structure of the wax. As a result, the inventors have found that the use of a wax represented by the general formula (1) can suppress the floating of the wax at the time of its still standing. The melt viscosity of the wax represented by the general formula (1) at the time of its dispersion reduces because the wax has a saturated linear hydrocarbon structure having no branch. Thus, the wax and a dispersant easily adsorb to each other to improve the dispersion stability of the wax. Probably as a result of the foregoing, the floating of the wax can be suppressed.

The inventors of the present disclosure have further investigated an additive to be incorporated into the ink together with the wax. As a result, the inventors have found that the incorporation of an ester compound represented by the general formula (2) into the ink together with the wax can suppress the floating of the wax at the time of the still standing of the ink. Although the effect was obtained to some extent no matter what structure the wax to be used had, a drastic effect was obtained particularly when the wax represented by the general formula (1) and the ester compound represented by the general formula (2) were used in combination.

The inventors of the present disclosure have assumed the reason why a drastic suppressing effect on the floating of the wax at the time of the still standing of the ink was obtained when the wax represented by the general formula (1) and the ester compound represented by the general formula (2) were used in combination to be as described later.

The ester compound represented by the general formula (2) has two structural features. The first feature is that the structure of the main chain moiety (moiety represented by H—(CH$_2$)$_a$—CH—(CH$_2$)$_b$—H) of the ester compound represented by the general formula (2) is a structure similar to that of the general formula (1). The second feature is that the ester compound represented by the general formula (2) has a bulky structure because the compound has an ester group moiety (—O—CO—(CH$_2$)$_c$—H) branching from its main chain.

First, the fact that the structure of the main chain moiety (moiety represented by H—(CH$_2$)$_a$—CH—(CH$_2$)$_b$—H) is a structure similar to that of the general formula (1), the fact serving as the first feature, may facilitate the adsorption of the ester compound represented by the general formula (2) to the surface of the particle of the wax represented by the general formula (1) as in the dispersant. Further, the fact that the ester compound represented by the general formula (2), the compound adsorbing to the wax, has a bulky structure, the fact serving as the second feature, may cause the compound to act to protect an adsorption point between the wax and the dispersant. Probably as a result of the foregoing, even when the water-soluble organic solvent is used, the separation of the dispersant from the wax can be suppressed and hence the floating of the wax can be suppressed.

(Ink)

The ink of the present disclosure is an aqueous ink for ink jet containing wax, dispersant for dispersing the wax, ester compound, and water-soluble organic solvent. Respective components to be used in the ink and the like are described in detail later.

(Wax Particle)

The ink includes a wax particle obtained by dispersing a wax represented by the following general formula (1) with a dispersant. The wax particle is a particle formed from the wax. In other words, the ink includes the wax and the dispersant for dispersing the wax. The waxes each represented by the general formula (1) may be used alone or in combination thereof. The use of the wax represented by the general formula (1) can improve the dispersion stability of the wax. A possible reason for the foregoing is as described later. The melt viscosity of the wax at the time of its dispersion reduces because the wax has a saturated linear hydrocarbon structure having no branch as described above. Thus, the wax and the dispersant easily adsorb to each other to improve the dispersion stability of the wax, to thereby enable the suppression of the floating of the wax.

$$C_nH_{2n+2} \quad (1)$$

"n" in the general formula (1) represents an integer of 20 or more to 80 or less (20≤n≤80). When "n" represents less than 20, the number of the carbon atoms of the wax is small and hence its sliding property is low. Accordingly, the abrasion resistance of an image is not obtained. Meanwhile, when "n" represents more than 80, the number of the carbon atoms of the wax is large and hence its molecular weight increases. Accordingly, the dispersion stability of the wax reduces. As a result, the storage stability of the ink is not obtained. From the viewpoint of the abrasion resistance, "n" in the general formula (1) preferably represents 40 or more to 80 or less.

The volume-based 50% cumulative particle diameter ($D_{50}$) of the wax measured by a dynamic light scattering method is preferably 50 nm or more to 500 nm or less, more preferably 100 nm or more to 300 nm or less. The volume-based 50% cumulative particle diameter of the wax is the diameter of the particle in a particle diameter cumulative curve at which the ratio of the particle integrated from small particle diameters reaches 50% with respect to the total volume of the measured particle. The volume-based 50% cumulative particle diameter of the wax may be measured with a particle size analyzer of a dynamic light scattering system to be described later and under measurement conditions to be described later.

A dispersant, such as a surfactant or a resin, may be used as the dispersant for dispersing the wax represented by the general formula (1) in the ink. The content (% by mass) of the dispersant in the ink is preferably 0.01% by mass or more to 5.00% by mass or less, more preferably 0.02% by mass or more to 3.00% by mass or less. In particular, the dispersant for dispersing the wax is a nonionic dispersant and an anionic dispersant. In other words, the wax is preferably dispersed by both a nonionic dispersant and an anionic dispersant. In this case, the nonionic dispersant is preferably a polyoxyethylene alkyl ether-based dispersant or a polyoxyethylene alkenyl ether-based dispersant. In addition, an ethylene-acrylic acid copolymer is preferably used as the anionic dispersant. Examples of the anionic dispersant include linear higher carboxylic acids (salts) and sulfonic acids (salts). More specifically, examples of the anionic dispersant include montanic acid, isomerized linoleic acid and salts thereof. The content (% by mass) of the nonionic dispersant in the ink is preferably 0.01% by mass or more to 2.50% by mass or less, more preferably 0.02% by mass or more to 2.00% by mass or less. In addition, the content (% by mass) of the anionic dispersant in the ink is preferably 0.01% by mass or more to 2.50% by mass or less, more preferably 0.02% by mass or more to 2.00% by mass or less.

The polyoxyethylene alkyl ether-based dispersant and the polyoxyethylene alkenyl ether-based dispersant have a hydrophobic moiety and a hydrophilic moiety including an ethylene oxide (EO) chain having a certain length, the moieties being separated from each other, and can stably disperse the wax through efficient adsorption of the hydrophobic moiety to the wax. The ethylene-acrylic acid copolymer can efficiently impart charge to the surface of the wax to stably disperse the wax.

Examples of the polyoxyethylene alkyl ether-based dispersant and the polyoxyethylene alkenyl ether-based dispersant include polyoxyethylene lauryl ether, polyoxyethylene tridecyl ether, polyoxyethylene myristyl ether, polyoxyethylene cetyl ether, polyoxyethylene oleyl ether, polyoxyethylene stearyl ether, polyoxyethylene isosterayl ether, polyoxyethylene behenyl ether and polyoxyethylene octyldodecyl ether.

When the nonionic dispersant and the anionic dispersant are used in combination, the anionic dispersant can act on the surface portion of the wax, on which the nonionic dispersant does not act, to impart charge thereto. It is conceivable from the foregoing that the dispersion stability of the wax is improved and hence the floating of the wax can be further suppressed.

In addition to the wax represented by the general formula (1), one or two or more kinds of other waxes may be incorporated into the ink. Each of the other waxes may be a composition blended with a component except the wax or may be the wax itself. The other waxes may each be dispersed by a dispersant, such as a surfactant or a resin.

The wax is an ester of a higher monohydric or dihydric alcohol that is insoluble in water and a fatty acid in a narrow sense. Accordingly, animal-based waxes and plant-based waxes are included in the category of the wax but oils and fats are not included therein. High-melting point fats, mineral-based waxes, petroleum-based waxes and blends and modified products of various waxes are included therein in a broad sense. In the present disclosure of the recording method, the waxes in a broad sense may each be used without any particular limitation. The waxes in a broad sense may be classified into natural waxes, synthetic waxes, blends thereof (blended waxes) and modified products thereof (modified waxes).

Examples of the natural wax may include: animal-based waxes, such as beeswax, a spermaceti wax and lanolin; plant-based waxes, such as a Japan wax, a carnauba wax, a sugar cane wax, a palm wax, a candelilla wax and a rice wax; mineral-based waxes such as a montan wax; and petroleum-based waxes, such as a paraffin wax, a microcrystalline wax and petrolatum. Examples of the synthetic wax may include hydrocarbon-based waxes, such as a Fischer-Tropsch wax and polyolefin waxes (e.g., polyethylene wax and polypropylene wax). The blended waxes are mixtures of the above-mentioned various waxes. The modified waxes are obtained by subjecting the above-mentioned various waxes to modification treatment, such as oxidation, hydrogenation, alcohol modification, acrylic modification or urethane modification. The above-mentioned waxes may be used alone or in combination thereof. The wax is preferably at least one kind selected from the group consisting of: a microcrystalline wax; a Fischer-Tropsch wax; a polyolefin wax; a paraffin wax; and modified products and blends thereof. Of those, a blend of a plurality of kinds of waxes is more preferred and a blend of a petroleum-based wax and a synthetic wax is particularly preferred.

Of the synthetic waxes, a Fischer-Tropsch wax is particularly preferably used from the viewpoints of the abrasion resistance and storage stability of the ink. In particular, a wax not subjected to any modification treatment and a wax subjected to modification treatment are more preferably used in combination.

The wax is preferably a solid at room temperature (25° C.). From the viewpoint of abrasion resistance, the melting point (° C.) of the wax is preferably 40° C. or more to 120° C. or less, more preferably 50° C. or more to 100° C. or less. The melting point of the wax may be measured in conformity with a test method described in the section 5.3.1 (Melting Point Testing Method) of JIS K 2235:1991 (Petroleum Waxes). In the cases of a microcrystalline wax, petrolatum and a mixture of a plurality of kinds of waxes, their melting points may be measured with higher accuracy by utilizing a test method described in the section 5.3.2 thereof. The melting point of the wax is susceptible to characteristics, such as a molecular weight (a larger molecular weight provides a higher melting point), a molecular structure (a linear structure provides a higher melting point but a branched structure provides a lower melting point), crystallinity (higher crystallinity provides a higher melting point) and a density (a higher density provides a higher melting point). Accordingly, the control of those characteristics can provide a wax having a desired melting point. The melting point of the wax in the ink may be measured, for example, as follows: after the wax fractionated by subjecting the ink to ultracentrifugation treatment has been washed and dried, its melting point is measured in conformity with each of the above-mentioned test methods.

The content (% by mass) of the wax in the ink is preferably 0.30% by mass or more to 8.00% by mass or less, more preferably 0.50% by mass or more to 4.00% by mass or less with respect to the total mass of the ink. The total content (% by mass) of the wax and the dispersant for dispersing the wax in the ink is preferably 0.50% by mass or more to 10.00% by mass or less, preferably 0.50% by mass or more to 9.00% by mass or less, more preferably 1.00% by mass or more to 5.00% by mass or less with respect to the total mass of the ink. The above-mentioned content is preferably 0.50% by mass or more from the viewpoint of the abrasion resistance of the image. In addition, the content is preferably 9.00% by mass or less from the viewpoint of the storage stability thereof. The content of the wax and the dispersant described above is the total content of the wax represented by the general formula (1) and the dispersant for dispersing the wax. In addition, the content of the dispersant for dispersing the wax is defined as the total content of the anionic dispersant and the nonionic dispersant to be described later.

(Ester Compound)

The ink includes an ester compound represented by the following general formula (2). The compounds each represented by the general formula (2) may be used alone or in combination thereof. When the ink includes the ester compound represented by the general formula (2), the dispersion stability of the wax is improved. A possible reason therefor is as follows: the structure of the main chain moiety (H—$(CH_2)_a$—CH—$(CH_2)_b$—H) of the ester compound represented by the general formula (2) is a structure similar to that of the wax represented by the general formula (1) and hence the ester compound easily adsorbs to the surface of the wax as in the dispersant. In addition, the ester compound may act to protect an adsorption point between the wax and the dispersant because the compound has a bulky structure formed by an ester group moiety ($-O-CO-(CH_2)_c-H$) branching from its main chain.

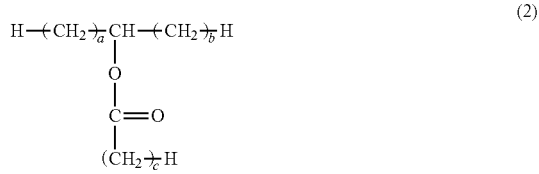

(2)

In the general formula (2), "a" and "b" each independently represent an integer of 1 or more (a≥1 and b≥1), the integers satisfying 20≤a+b+1≤80, and "c" represents an integer of 10 or more to 40 or less (10≤c≤40). To improve the effect by which the ester compound is caused to adsorb to the surface of the wax, it is important that the number "a+b+1" of the carbon atoms of the main chain fall within the same range as that of the number "n" of the carbon atoms in the general formula (1) in the wax. Accordingly, the number of the carbon atoms of the main chain preferably satisfy the formula "20≤a+b+1≤80."

Further, in order that a steric hindrance effect may be exhibited by the bulkiness of the ester compound, a relationship of 10≤c≤40 needs to be satisfied. When "c" represents less than 10, the bulkiness of the ester compound reduces to reduce the steric hindrance effect. Accordingly, the separation of the dispersant from the wax cannot be suppressed and hence the floating of the wax occurs. As a result, the storage stability of the ink is not obtained. In addition, when "c" represents more than 40, the molecular weight of the ester compound increases to inhibit the adsorption of the dispersant and hence the dispersion stability of the wax is not obtained. As a result, the floating of the wax occurs and hence the storage stability of the ink is not obtained.

In addition, the wax represented by the general formula (1) and the ester compound represented by the general formula (2) preferably satisfy a relationship of 0.50≤(a+b+1)/n≤1.50 between "n" in the general formula (1) and "a" and "b" in the general formula (2). This is because as the values of the number ("n") of the carbon atoms of the wax and the number (a+b+1) of the carbon atoms of the linear moiety of the ester compound become closer to each other, the ester compound can more effectively adsorb to the wax to efficiently protect an adsorption point between the wax and the dispersant. As a result, the dispersion stability of the wax is improved and hence the storage stability of the ink can be further improved.

In addition, in the ester compound represented by the general formula (2), "a" and "b" in the general formula (2) preferably satisfy a relationship of 0.50≤a/b≤1.50. This is because as an ester group is positioned closer to the center of the main chain of the ester compound, the bulkiness of the compound can more effectively exhibit steric hindrance. As a result, the dispersion stability of the wax is improved and hence the storage stability of the ink can be further improved.

Further, the content W (% by mass) of the wax in the ink, the content X (% by mass) of the dispersant in the ink and the content Y (% by mass) of the above-mentioned ester compound in the ink with respect to the total mass of the ink preferably satisfy a relationship of 0.40≤(Y/(W+X))× 100≤12.00. When the value of "(Y/(W+X))×100" is 0.40 or more, the amount of the ester compound is moderately sufficient for the wax and the dispersant and hence a suppressing effect on the separation of the dispersant from the wax is easily exhibited. Accordingly, the floating of the wax is easily suppressed and hence the storage stability of the ink can be further improved. When the value of "(Y/(W+X))×100" is 12.00 or less, the amount of the ester compound for the wax and the dispersant is moderately suppressed to facilitate the adsorption of the dispersant to the wax and hence the dispersion stability of the wax is improved. As a result, the floating of the wax is easily suppressed and hence the storage stability of the ink can be further improved.

The content (% by mass) of the ester compound represented by the general formula (2) in the ink is preferably 0.003% by mass or more to 0.70% by mass or less, more preferably 0.003% by mass or more to 0.50% by mass or less with respect to the total mass of the ink. In particular, the content (% by mass) of the ester compound represented by the general formula (2) in the ink is particularly preferably 0.008% by mass or more to 0.40% by mass or less with respect to the total mass of the ink.

(Fatty Acid)

The ink preferably further includes a fatty acid represented by the following general formula (3):

(3)

in the general formula (3), "d" represents an integer of 10 or more to 40 or less.

A long-chain hydrocarbon moiety (($CH_2)_d$) in the general formula (3) in the above-mentioned fatty acid acts on a hydrocarbon moiety (moiety represented by $-(CH_2)_c-H$) bonded to the ester group in the ester compound represented by the general formula (2). Thus, the fatty acid can act to impart charge to the wax and hence can improve the dispersion stability of the wax. In order that the fatty acid represented by the general formula (3) may effectively act on the ester compound represented by the general formula (2), it is important that the number of the carbon atoms of the number of the carbon atoms of a long-chain hydrocarbon moiety in the general formula (3) fall within the same range as that of the number of the carbon atoms of hydrocarbon moiety bonded to the ester group in the ester compound represented by the general formula (2)) Accordingly, the fatty acid needs to satisfy a relationship of 10≤d≤40.

The content (% by mass) of the fatty acid represented by the general formula (3) in the ink is preferably 0.001% by mass or more to 0.40% by mass or less, more preferably 0.001% by mass or more to 0.30% by mass or less with respect to the total mass of the ink. In particular, the content (% by mass) of the fatty acid represented by the general formula (3) in the ink is particularly preferably 0.003% by mass or more to 0.20% by mass or less with respect to the total mass of the ink.

The content Y (% by mass) of the ester compound represented by the general formula (2) in the ink and the content Z (% by mass) of the fatty acid represented by the general formula (3) in the ink with respect to the total mass of the ink preferably satisfy a relationship of 0.20≤Z/Y≤0.80. When the value of "Z/Y" is 0.20 or more, the amount of the fatty acid is moderately sufficient for the ester compound. Accordingly, a stabilizing effect on the dispersion of the wax is improved and hence the floating of the wax is easily suppressed. As a result, the storage stability of the ink can be further improved. Meanwhile, when the value of "Z/Y" is 0.80 or less, the amount of the fatty acid for the ester compound is moderately suppressed and hence most of the fatty acid present in the ink can be caused to act on the ester compound. As a result, the dispersion stability of the wax is improved and hence the storage stability of the ink can be further improved.

The content W (% by mass) of the wax in the ink, the content X (% by mass) of the dispersant therein and the content Z (% by mass) of the fatty acid represented by the general formula (3) therein with respect to the total mass of the ink preferably satisfy a relationship of $0.20 \leq (Z/(W+X)) \times 100 \leq 8.30$. When the value of "$(Z/(W+X)) \times 100$" is 0.20 or more, the amount of the fatty acid is moderately sufficient for the wax and the dispersant. Accordingly, a stabilizing effect on the dispersion of the wax is improved and hence the floating of the wax is easily suppressed. As a result, the storage stability of the ink can be further improved. Meanwhile, when the value of "$(Z/(W+X)) \times 100$" is 8.30 or less, the amount of the fatty acid for the wax and the dispersant is moderately suppressed and hence most of the fatty acid present in the ink can be caused to act on the ester compound. As a result, the dispersion stability of the wax is improved and hence the storage stability of the ink can be further improved.

[Coloring Material]

The ink preferably includes the coloring material. A pigment or a dye may be used as the coloring material. The content (% by mass) of the coloring material in the ink is preferably 0.5% by mass or more to 15.0% by mass or less, more preferably 1.0% by mass or more to 10.0% by mass or less with respect to the total mass of the ink.

Specific examples of the pigment may include: inorganic pigments, such as carbon black and titanium oxide; and organic pigments, such as azo, phthalocyanine, quinacridone, isoindolinone, imidazolone, diketopyrrolopyrrole and dioxazine pigments. The pigments may be used alone or in combination thereof.

A resin-dispersed pigment using a resin as a dispersant, a self-dispersible pigment, which has a hydrophilic group bonded to its particle surface, or the like may be used as a dispersion system for the pigment. In addition, a resin-bonded pigment having a resin-containing organic group chemically bonded to its particle surface, a microcapsule pigment, which contains a particle whose surface is covered with, for example, a resin, or the like may be used. Pigments different from each other in dispersion system out of those pigments may be used in combination. In the present disclosure, not a resin-bonded pigment or a microcapsule pigment but a resin-dispersed pigment having resin as dispersant to physically adsorb to its particle surface of pigment or a self-dispersible pigment having a hydrophilic group bonded to its particle surface is preferably used.

A dispersant that can disperse the pigment in an aqueous medium through the action of an anionic group is preferably used as a resin dispersant for dispersing the pigment in the aqueous medium. A resin having an anionic group may be used as the resin dispersant and such a resin as described later, in particular, a water-soluble resin is preferably used. The mass ratio of the content (% by mass) of the pigment in the ink to the content (% by mass) of the resin dispersant therein is preferably 0.3 times or more to 10.0 times or less.

A pigment having an anionic group bonded to its particle surface directly or through any other atomic group (—R—) may be used as the self-dispersible pigment. Specific examples of the other atomic group (—R—) may include: a linear or branched alkylene group having 1 to 12 carbon atoms; an arylene group, such as a phenylene group or a naphthylene group; a carbonyl group; an imino group; an amide group; a sulfonyl group; an ester group; and an ether group. In addition, groups obtained by combining those groups may be adopted.

A dye having an anionic group is preferably used as the dye. Specific examples of the dye may include dyes, such as azo, triphenylmethane, (aza)phthalocyanine, xanthene and anthrapyridone dyes. The dyes may be used alone or in combination thereof. The coloring material is preferably a pigment, more preferably a resin-dispersed pigment or a self-dispersible pigment.

The anionic groups mentioned above in the description of a resin dispersant, a self-dispersible pigment, and a dye include, for example, a carboxylic acid group, a sulfonic acid group, and a phosphonic acid group. The anionic group may be any one of an acid type or a salt type. When the group is a salt type, the group may be in any one of a state in which part of the group dissociates or a state in which the entirety thereof dissociates. When the anionic group is a salt type, examples of a cation serving as a counterion may include an alkali metal cation, ammonium and an organic ammonium. The color material contained in the ink is preferably a pigment, and more preferably a resin-dispersed pigment or a self-dispersible pigment.

[Resin]

A resin may be incorporated into the ink. The content (% by mass) of the resin in the ink is preferably 0.1% by mass or more to 20.0% by mass or less, more preferably 0.5% by mass or more to 15.0% by mass or less with respect to the total mass of the ink.

The resin may be added to the ink for (i) stabilizing the dispersed state of the pigment, that is, as a resin dispersant or an aid therefor. In addition, the resin may be added to the ink for (ii) improving the various characteristics of an image to be recorded.

Examples of the form of the resin may include a block copolymer, a random copolymer, a graft copolymer and a combination thereof. In addition, the resin may be a water-soluble resin that can be dissolved in an aqueous medium or may be a resin particle to be dispersed in the aqueous medium. The resins may be used alone or in combination thereof.

[Composition of Resin]

Examples of the resin may include an acrylic resin, a urethane-based resin and an olefin-based resin. Of those, an acrylic resin and a urethane-based resin are preferred and an acrylic resin including a unit derived from (meth)acrylic acid or a (meth)acrylate is more preferred.

A resin having a hydrophilic unit and a hydrophobic unit as its structural units is preferred as the acrylic resin. Of those, a resin having a hydrophilic unit derived from (meth) acrylic acid and a hydrophobic unit derived from at least one selected from the group consisting of a monomer having an aromatic ring and a (meth)acrylic acid ester-based monomer is preferred. A resin having a hydrophilic unit derived from (meth)acrylic acid and a hydrophobic unit derived from at least one monomer selected from the group consisting of styrene and α-methylstyrene is particularly preferred. Those resins may each be suitably utilized as a resin dispersant for dispersing the pigment because the resins each easily cause an interaction with the pigment.

The hydrophilic unit is a unit having a hydrophilic group such as an anionic group. The hydrophilic unit may be formed by, for example, polymerizing a hydrophilic monomer having a hydrophilic group. Specific examples of the hydrophilic monomer having a hydrophilic group may include: acidic monomers each having a carboxylic acid group, such as (meth)acrylic acid, itaconic acid, maleic acid and fumaric acid; and anionic monomers, such as anhydrides and salts of these acidic monomers. A cation for forming the salt of the acidic monomer may be, for example, a lithium, sodium, potassium, ammonium or organic ammonium ion. The hydrophobic unit is a unit free of a hydrophilic group such as an anionic group. The hydrophobic unit may be formed by, for example, polymerizing the hydrophobic monomer free of a hydrophilic group such as anionic group. Specific examples of the hydrophobic monomer may include: monomers each having an aromatic ring, such as styrene, α-methylstyrene and benzyl (meth)acrylate; and (meth)acrylic acid ester-based monomers, such as methyl (meth)acrylate, butyl (meth)acrylate and 2-ethylhexyl (meth)acrylate.

The urethane-based resin may be obtained by, for example, causing a polyisocyanate and a polyol to react with each other. In addition, a chain extender may be further caused to react with the reaction product. Examples of the olefin-based resin may include polyethylene and polypropylene.

[Properties of Resin]

The phrase "resin is water-soluble" as used herein means that when the resin is neutralized with an alkali whose amount is equivalent to its acid value, the resin is present in an aqueous medium under a state in which the resin does not form any particle whose particle diameter may be measured by a dynamic light scattering method. Whether or not the resin is water-soluble can be judged in accordance with the following method. First, a liquid (resin solid content: 10% by mass) containing the resin neutralized with an alkali (e.g., sodium hydroxide or potassium hydroxide) corresponding to its acid value is prepared. Next, the prepared liquid is diluted with pure water tenfold (on a volume basis) to prepare a sample solution. Then, when no particle having a particle diameter is measured at the time of the measurement of the particle diameter of the resin in the sample solution by the dynamic light scattering method, the resin can be judged to be water-soluble. Measurement conditions at this time may be set, for example, as follows: SetZero: 30 seconds; number of times of measurement: 3; and measurement time: 180 seconds. In addition, a particle size analyzer based on the dynamic light scattering method (e.g., an analyzer available under the product name "UPA-EX150" from Nikkiso Co., Ltd.) or the like may be used as a particle size distribution measuring device. Of course, the particle size distribution measuring device to be used, the measurement conditions and the like are not limited to the foregoing.

The acid value of the water-soluble resin is preferably 100 mgKOH/g or more to 250 mgKOH/g or less. The weight-average molecular weight of the water-soluble resin is preferably 3,000 or more to 15,000 or less.

The acid value of a resin for forming the resin particle is preferably 5 mgKOH/g or more to 100 mgKOH/g or less. The weight-average molecular weight of the resin for forming the resin particle is preferably 1,000 or more to 3,000,000 or less, more preferably 100,000 or more to 3,000,000 or less. The volume-based 50% cumulative particle diameter ($D_{50}$) of the resin particle measured by a dynamic light scattering method is preferably 50 nm or more to 500 nm or less. The volume-based 50% cumulative particle diameter of the resin particle is the diameter of the particle in a particle diameter cumulative curve at which the ratio of the particle integrated from small particle diameters reaches 50% with respect to the total volume of the measured particle. The volume-based 50% cumulative particle diameter of the resin particle may be measured with the above-mentioned particle size analyzer of a dynamic light scattering system and under the above-mentioned measurement conditions. The glass transition temperature of the resin particle is preferably 40° C. or more to 120° C. or less, more preferably 50° C. or more to 100° C. or less. The glass transition temperature (° C.) of the resin particle may be measured with a differential scanning calorimeter (DSC). The resin particle does not need to include any coloring material.

[Aqueous Medium]

The ink is an aqueous ink including a mixed solvent of the water and a water-soluble organic solvent. Deionized water or ion-exchanged water is preferably used as the water. The content (% by mass) of the water in the aqueous ink is preferably 50.0% by mass or more to 95.0% by mass or less with respect to the total mass of the ink. In addition, the content (% by mass) of the water-soluble organic solvent in the aqueous ink is preferably 2.0% by mass or more to 45.0% by mass or less with respect to the total mass of the ink. Solvents that may be used in an ink for ink jet, such as alcohols, (poly)alkylene glycols, glycol ethers, nitrogen-containing compounds and sulfur-containing compounds, may each be used as the water-soluble organic solvent. The water-soluble organic solvents may be used alone or in combination thereof.

[Water-Soluble Hydrocarbon Compound]

The water-soluble organic solvent to be incorporated into the ink preferably contains a specific water-soluble hydrocarbon compound. The water-soluble hydrocarbon compound is a compound having a hydrocarbon chain having 3 or more carbon atoms, the compound being substituted with 2 or more hydrophilic groups each selected from the group consisting of: a hydroxy group; an amino group; and an anionic group. However, the hydrocarbon chain may be interrupted by a sulfonyl group or an ether group. When the number of the carbon atoms of the hydrocarbon chain is 3 or 4, the hydrophilic groups include an anionic group or the hydrocarbon chain is interrupted by a sulfonyl group.

In the present disclosure, a hydrocarbon compound in the state of being dissolved in water at a content of the compound in the ink at 25° C. is defined as being "water-soluble". That is, the solubility of the compound in water at 25° C. is larger than the content thereof in the ink. The fact that the hydrocarbon chain is interrupted by a sulfonyl group or an ether group means that a sulfonyl group (—S(=O)$_2$—) or an ether group (—O—) is present in the middle of the hydrocarbon chain. The water-soluble hydrocarbon compound has hydrogen-bonding groups, such as a hydroxy group, an amino group, an anionic group, a sulfonyl group and an ether group. Accordingly, the use of the ink including the hydrocarbon compound can suppress the cockling or curl of a recording medium having recorded thereon an image. A general hydrocarbon compound having a hydrocarbon chain having a relatively small number of carbon atoms (3 or 4 carbon atoms) tends to have a small molecular weight and hence have a low vapor pressure. However, the above-mentioned water-soluble hydrocarbon compound has a hydrogen-bonding anionic group or its hydrocarbon chain is interrupted by a sulfonyl group. Accordingly, the compound hardly evaporates owing to an intermolecular or intramolecular interaction and hence remains between fibers for constituting the recording medium to exhibit a suppressing action on the cockling or the curl. The content (% by mass) of the water-soluble hydrocarbon compound in the ink is preferably 1.0% by mass or more to 20.0% by mass or less with respect to the total mass of the ink.

The number of the carbon atoms of the hydrocarbon chain for forming the water-soluble hydrocarbon compound is preferably 3 or more to 50 or less, more preferably 3 or more to 10 or less. Examples of the anionic group may include a sulfonic acid group and a carboxylic acid group. Specific examples of the water-soluble hydrocarbon compound may include: alkanediols, such as 1,5-pentanediol and 1,6-hexanediol; amino acids, such as alanine, β-alanine, trimethylglycine, amidosulfuric acid (alias: sulfamic acid), aminomethanesulfonic acid, taurine (alias: 2-aminoethanesulfonic acid), carbamic acid, glycine, aspartic acid, glutamic acid, sulfanilic acid or salts of any of the acids described above, phenylalanine, leucine, isoleucine, threonine, tryptophan, valine, methionine, lysine and arginine; sulfonyl compounds such as bis(2-hydroxyethyl) sulfone; alkylene glycols, such as triethylene glycol, tetraethylene glycol, tripropylene glycol and a polyethylene glycol having a number-average molecular weight of from about 200 to about 1,000; and sugars, such as sorbitol, D-sorbitol, xylitol, trehalose, fructose and D(+)-xylose. The water-soluble hydrocarbon compounds may be used alone or in combination thereof.

[Other Component]

The ink may include various additives, such as an antifoaming agent, a surfactant, a pH adjustor, a viscosity modifier, a rust inhibitor, an antiseptic, a fungicide, an antioxidant and an anti-reducing agent, as required in addition to the above-mentioned components. However, the ink is preferably free of the reactant to be used in the reaction liquid as described below.

[Physical Properties of Ink]

The ink is an aqueous ink to be applied to an ink jet system. Accordingly, from the viewpoint of reliability, it is preferred that the physical property values of the ink be appropriately controlled. Specifically, the surface tension of the ink at 25° C. is preferably 20 mN/m or more to 60 mN/m or less. In addition, the viscosity of the ink at 25° C. is preferably 1.0 mPa·s or more to 10.0 mPa·s or less. The pH of the ink at 25° C. is preferably 7.0 or more to 9.5 or less, more preferably 8.0 or more to 9.5 or less.

(Reaction Liquid)

The recording method of the present disclosure preferably further includes, before an ink applying step, a reaction liquid applying step of applying an aqueous reaction liquid, which contains a reactant that reacts with the aqueous ink, to the recording medium. Respective components to be used in the reaction liquid and the like are described in detail below.

[Reactant]

The reaction liquid is brought into contact with the ink to react with the ink, to thereby aggregate components (a component having an anionic group such as a resin, a dispersant for dispersing wax, and a self-dispersible pigment) in the ink. The reaction liquid contains the reactant. When the reactant is present, at the time of contact between the ink and the reactant in the recording medium, the state of presence of the component having an anionic group in the ink is destabilized and hence the aggregation of the ink can be accelerated. Examples of the reactant may include: a polyvalent metal ion; a cationic component such as a cationic resin; and an organic acid. The reactants may be used alone or in combination thereof.

Examples of the polyvalent metal ion forming a polyvalent metal salt may include: divalent metal ions, such as $Ca^{2+}$, $Cu^{2+}$, $Ni^{2+}$, $Mg^{2+}$, $Sr^{2+}$, $Ba^{2+}$ and $Zn^{2+}$; and trivalent metal ions, such as $Fe^{3+}$, $Cr^{3+}$, $Y^{3+}$ and $Al_{3+}$. A water-soluble polyvalent metal salt (which may be a hydrate) made up of the polyvalent metal ion and an anion bonded to each other may be used to incorporate the polyvalent metal ion into the reaction liquid. Examples of such anion may include: inorganic anions, such as $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^-$, $HCO_3^-$, $PO_4^{3-}$, $HPO_4^{2-}$ and $H_2PO_4^-$; and organic anions, such as $HCOO^-$, $(COO^-)_2$, $COOH(COO^-)$, $CH_3COO^-$, $CH_3CH(OH)COO^-$, $C_2H_4(COO^-)_2$, $C_6H_5COO^-$, $C_6H_4(COO^-)_2$ and $CH_3SO_3^-$. When the polyvalent metal ion is used as the reactant, its content (% by mass) in terms of polyvalent metal salt in the reaction liquid is preferably 1.0% by mass or more to 20.0% by mass or less with respect to the total mass of the reaction liquid. In this specification, when the polyvalent metal salt is a hydrate, the "content (% by mass) of the polyvalent metal salt" in the reaction liquid means the "content (% by mass) of the anhydride of the polyvalent metal salt" obtained by removing water serving as a hydrate.

The reaction liquid containing the organic acid has a buffering capacity in an acidic region (at a pH of less than 7.0, preferably at a pH of from 2.0 to 5.0) to efficiently turn the anionic group of the components present in the ink into an acid type, to thereby aggregate the ink. Examples of the organic acid may include: monocarboxylic acids, such as formic acid, acetic acid, propionic acid, butyric acid, benzoic acid, glycolic acid, lactic acid, salicylic acid, pyrrolecarboxylic acid, furancarboxylic acid, picolinic acid, nicotinic acid, thiophenecarboxylic acid, levulinic acid and coumalic acid, and salts thereof; dicarboxylic acids, such as oxalic acid, malonic acid, succinic acid, glutaric acid, adipic acid, maleic acid, fumaric acid, itaconic acid, sebacic acid, phthalic acid, malic acid and tartaric acid, and salts and hydrogen salts thereof; tricarboxylic acids, such as citric acid and trimellitic acid, and salts and hydrogen salts thereof; and tetracarboxylic acids such as pyromellitic acid, and salts and hydrogen salts thereof. When the organic acid is used as the reactant, the content (% by mass) of the organic acid in the reaction liquid is preferably 1.0% by mass or more to 50.0% by mass or less with respect to the total mass of the reaction liquid.

Examples of the cationic resin may include resins having structures of primary to tertiary amines and resins having structures of quaternary ammonium salts. Specific examples thereof may include resins having structures of, for example, vinylamine, allylamine, vinylimidazole, vinylpyridine, dimethylaminoethyl methacrylate, ethylene imine, guanidine, diallyldimethylammonium chloride and an alkylamine-epichlorohydrin condensate. To improve solubility in the reaction liquid, the cationic resin and an acidic compound may be used in combination or the cationic resin may be subjected to quaternization treatment. When the cationic resin is used as the reactant, the content (% by mass) of the cationic resin in the reaction liquid is preferably 0.1% by mass or more to 10.0% by mass or less with respect to the total mass of the reaction liquid.

[Aqueous Medium]

The reaction liquid is an aqueous reaction liquid containing at least water as an aqueous medium. Examples of the aqueous medium to be used in the reaction liquid may include the same examples as those of an aqueous medium that can be incorporated into the ink described above. The content (% by mass) of the water-soluble organic solvent in the reaction liquid is preferably 1.0% by mass or more to 45.0% by mass or less with respect to the total mass of the reaction liquid. The water-soluble organic solvent preferably contains a specific water-soluble hydrocarbon compound described above. The content (% by mass) of the water-soluble hydrocarbon compound in the reaction liquid is preferably 1.0% by mass or more to 20.0% by mass or less with respect to the total mass of the reaction liquid. In addition, the content (% by mass) of the water in the reaction liquid is preferably 50.0% by mass or more to 95.0% by mass or less with respect to the total mass of the reaction liquid.

[Other Component]

The reaction liquid may contain various other components as required. Examples of the other components may include the same examples as those of other components that can be incorporated into the ink described above. However, the reaction liquid preferably does not contain a wax.

[Physical Properties of Reaction Liquid]

The reaction liquid is an aqueous reaction liquid to be applied to an ink jet system. Accordingly, from the viewpoint of reliability, it is preferred that the physical property values of the reaction liquid be appropriately controlled. Specifically, the surface tension of the reaction liquid at 25° C. is preferably 20 mN/m or more to 60 mN/m or less. In addition, the viscosity of the reaction liquid at 25° C. is preferably 1.0 mPa·s or more to 10.0 mPa·s or less. The pH of the reaction liquid at 25° C. is preferably 5.0 or more to 9.5 or less, more preferably 6.0 or more to 9.0 or less.

<Ink Jet Recording Method and Ink Jet Recording Apparatus>

The ink jet recording method according to one embodiment of the present disclosure and an ink jet recording apparatus that may be suitably used in the ink jet recording method are described below with reference to the drawings. The ink jet recording method of this embodiment is a method including ejecting the above-mentioned ink from a recording head of an ink jet system to record an image on a recording medium. The inkjet recording apparatus of the present embodiment is provided with the above-mentioned ink and an inkjet recording head for ejecting the ink.

FIG. 1 is a schematic view for illustrating an example of the schematic configuration of an ink jet recording apparatus 100 of this embodiment. The ink jet recording apparatus 100 is an ink jet recording apparatus that records an image on a recording medium with a reaction liquid containing a reactant that reacts with an ink and the ink. Herein, description is given by taking a case in which the reaction liquid is used together with the ink as an example. However, the reaction liquid may not be used. An X-direction, a Y-direction and a Z-direction represent the width direction (total length direction), depth direction and height direction of the ink jet recording apparatus, respectively. The recording medium is conveyed in the X-direction.

The ink jet recording apparatus 100 of the embodiment illustrated in FIG. 1 includes: a recording portion 1000; a heating portion 2000; a fixing portion 3000; and a sheet delivery portion 4000. In the recording portion 1000, various liquids are applied to a recording medium 1100, which has been conveyed from a sheet feeding device 1400 by a conveying member 1300, by a liquid applying device 1200. In the heating portion 2000, the liquid components of an image formed by the liquids applied to the recording medium 1100 are evaporated and dried by heating with a heating device 2100. In the fixing portion 3000, a fixing member 3100 is brought into contact with the region of the recording medium 1100 including the image to heat the image, to thereby accelerate the fixation of the image to the recording medium 1100. After that, the recording medium 1100 is conveyed by the conveying member 4100 of the sheet delivery portion 4000 and is loaded and stored in a recording medium storage portion 4200. Herein, description is given by taking a configuration including the heating portion 2000 and the fixing portion 3000 as an example. However, the heating portion or the fixing portion may be omitted in accordance with recording conditions (e.g., the kinds of the ink and the recording medium and a recording speed). In Examples to be described later, recording was performed without use of the heating portion 2000 and the fixing portion 3000.

Any medium may be used as the recording medium 1100. For example, such recording media each having ink absorbability (permeability) as described below may each be used as the recording medium 1100: a recording medium free of a coating layer, such as plain paper, uncoated paper or synthetic paper; and a recording medium including a coating layer, such as glossy paper or art paper. In addition, a recording medium that does not have permeability like a film or a sheet formed from a resin material, such as polyvinyl chloride (PVC) or polyethylene terephthalate (PET), may be used. The basis weight (g/m$^2$) of the recording medium 1100 is preferably 30 g/m$^2$ or more to 500 g/m$^2$ or less, more preferably 50 g/m$^2$ or more to 450 g/m$^2$ or less.

[Recording Portion]

The recording portion 1000 includes the liquid applying device 1200. The liquid applying device 1200 includes a reaction liquid applying device 1201 and an ink applying device 1202. The reaction liquid applying device 1201 illustrated in FIG. 1 is an example of a unit using an ejection head of an ink jet system. The reaction liquid applying device may be formed by utilizing a gravure coater, an offset coater, a die coater, a blade coater or the like in addition to the ejection head. The reaction liquid may be applied by the reaction liquid applying device 1201 before the application of the ink or may be applied after the ink application as long as the liquid can be brought into contact with the ink on the recording medium 1100. However, to record a high-quality image on various recording media having different liquid-absorbing characteristics, the reaction liquid is preferably applied before the application of the ink. An ejection head (recording head) of an ink jet system is used as the ink applying device 1202. Examples of the ejection system of the ejection head serving as the liquid applying device 1200 include: a system including causing film boiling in a liquid with an electro-thermal converter to form air bubbles, to thereby eject the liquid; and a system including ejecting the liquid with an electro-mechanical converter.

The liquid applying device 1200 is a line head arranged in the Y-direction in an extended manner and its ejection orifices are arrayed in a range covering the image recording region of the recording medium having the maximum usable width. The ejection head has an ejection orifice surface (not shown) having formed therein ejection orifices on its lower side (recording medium 1100 side). The ejection orifice surface faces the recording medium 1100 with a minute distance of about several millimeters therebetween.

The plurality of ink applying devices 1202 may be arranged for applying inks of respective colors to the recording medium 1100. For example, when respective color images are recorded with a yellow ink, a magenta ink, a cyan ink and a black ink, the four ink applying devices 1202 that eject the above-mentioned four kinds of inks are arranged side by side in the X-direction. The ink and the reaction liquid are hereinafter sometimes collectively referred to as "liquids".

Figure 2:
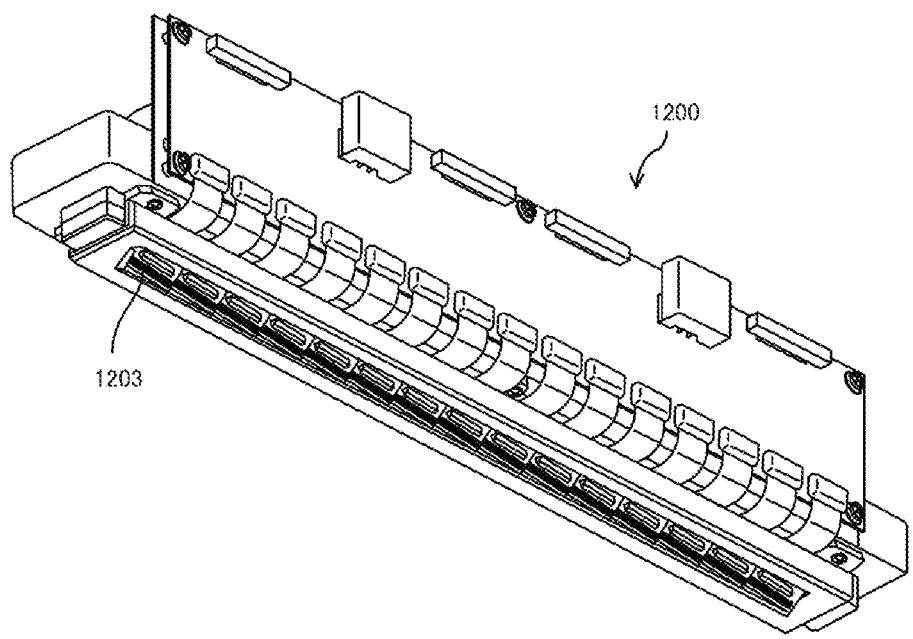
FIG. 2 is a perspective view for illustrating an example of a liquid applying device according to one embodiment of the present disclosure.

FIG. 2 is a perspective view for illustrating an example of the liquid applying device. The liquid applying device 1200 illustrated in FIG. 2 is a line head and a plurality of ejection element substrates 1203 having arranged therein ejection orifice arrays are linearly arrayed. The ejection element substrates 1203 each have arrayed therein a plurality of ejection orifice arrays.

[Conveyance System]

As illustrated in FIG. 1, the recording portion 1000 includes the liquid applying device 1200 and the conveying member 1300 that conveys the recording medium 1100. The reaction liquid and the ink are applied to the desired positions of the recording medium 1100, which is conveyed by the conveying member 1300, by the liquid applying device 1200. The respective liquid applying devices receive the image signal of drawing data to apply the required reaction liquid and ink to the respective positions. Although the conveying member 1300 in the form of a conveying belt is illustrated in FIG. 1, for example, a spur or a conveying cylinder may be utilized as long as the spur or the cylinder has a function of conveying the recording medium 1100. A member that can fix the recording medium 1100 may be used as the conveying member 1300 for improving conveyance accuracy. Specific examples thereof may include: an approach including arranging holes in the conveying member 1300 and sucking the recording medium 1100 from its rear surface side to fix the medium; and an approach including forming the conveying member 1300 from an appropriate material and electrostatically adsorbing the recording medium 1100 to fix the medium.

[Heating Portion]

As illustrated in FIG. 1, the heating portion 2000 includes the heating device 2100 and a conveying member 2200. The recording medium 1100 having recorded thereon the image through the application of the reaction liquid and the ink is heated by the heating device 2100 while being conveyed by the conveying member 2200. Thus, the liquid components of the image are evaporated and dried. The recording method preferably further includes, between the ink applying step and the fixing step, a drying step of subjecting the recording medium having applied thereto the ink to non-contact heating to dry the ink. The presence of such drying step can effectively suppress the deformation (cockling or curl) of the recording medium 1100.

The heating device 2100 may have any configuration as long as the device can heat the recording medium 1100. Conventionally known various devices, such as a warm-air dryer and a heater, may each be used. Of those, a non-contact-type heater, such as a heating wire and an infrared heater, is preferably utilized in terms of safety and energy efficiency. In addition, the utilization of the following mechanism easily improves the drying efficiency: the mechanism has built therein a fan for jetting a heated gas on the recording medium 1100 and blows warm air thereto.

With regard to a method for the heating, the recording medium 1100 may be heated from the side of the surface having applied thereto the reaction liquid and the ink, may be heated from its rear surface side or may be heated from both the surfaces. A heating function may be imparted to the conveying member 2200. Although the conveying member 2200 in the form of a conveying belt is illustrated in FIG. 1, for example, a spur or a conveying cylinder may be utilized as long as the spur or the cylinder has a function of conveying the recording medium 1100.

[Fixing Portion]

As illustrated in FIG. 1, in the fixing portion 3000, the recording medium 1100 is conveyed by a conveying member 3200. In addition, the fixing member 3100 is brought into contact with the recording medium 1100 under a state in which the medium is pressurized to heat the liquids applied to the recording medium 1100, such as the reaction liquid and the ink. Thus, an image can be fixed to the recording medium 1100. After the permeation of the liquid components of the reaction liquid and the ink into the recording medium 1100 having recorded thereon the image and the evaporation thereof from the recording medium 1100 by their passing through the heating portion 2000, the reaction liquid and the ink are fixed in the fixing portion 3000 to complete the image. When the recording medium 1100 is heated and pressurized under the state of being sandwiched between the fixing member 3100 and the conveying member 3200, the image on the recording medium 1100 and the fixing member 3100 are brought into close contact with each other and hence the image is fixed to the recording medium. When a liquid such as an ink containing the resin particle and a coloring material is used, the resin particle is softened through heating mainly by the fixing portion 3000 to form a film and hence the coloring material can be bound onto the recording medium 1100.

A method of heating the fixing member 3100 may be, for example, a system including arranging a heat source such as a halogen heater in each of rollers that drive the fixing member 3100 serving as a fixing belt to heat the member. In addition, the method may be, for example, a system including arranging a heat source such as an infrared heater at a site different from the fixing member 3100 to heat the member. Further, those systems may be combined with each other.

[Sheet Delivery Portion]

The recording medium 1100 after the image recording is stored in the sheet delivery portion 4000 (FIG. 1). Specifically, the recording medium 1100 after the recording is conveyed by the conveying member 4100 to be finally stored under the state of being loaded in the recording medium storage portion 4200. The two or more recording medium storage portions 4200 may be arranged for, for example, separately storing different recorded products.

EXAMPLES

The present disclosure is described in more detail below by way of Examples and Comparative Examples. The present disclosure is by no means limited to Examples below without departing from the gist of the present disclosure. "Part(s)" and "%" with regard to the description of the amounts of components are by mass, unless otherwise stated.

<Preparation of Pigment Dispersion Liquid>

(Pigment Dispersion Liquid 1)

A styrene-ethyl acrylate-acrylic acid copolymer (resin 1) having an acid value of 150 mg KOH/g and a weight-average molecular weight of 8,000 was prepared. 20.0 Parts of the resin 1 was neutralized with potassium hydroxide whose molar amount was equivalent to its acid value. In addition, an appropriate amount of pure water was added to the neutralized product to prepare an aqueous solution of the resin 1 in which the content of the resin (solid content) was 20.0%. 10.0 Parts of a pigment (C.I. Pigment Blue 15:3), 15.0 parts of the aqueous solution of the resin 1 and 75.0 parts of pure water were mixed to provide a mixture. The resulting mixture and 200 parts of 0.3 mm diameter zirconia bead were placed in a batch-type vertical sand mill (manufactured by AIMEX Co., Ltd.) and the mixture was dispersed for 5 hours while cooling in water. After centrifugation to remove a coarse particle, the product was pressure filtered through a cellulose acetate filter having a pore size of 3.0 μm (manufactured by Advantec). In this way, pigment dispersion liquid 1 in which the content of the pigment (C.I.

Pigment Blue 15:3) was 20.0% and the content of the resin dispersant (resin 1) was 10.0%, was prepared.

(Pigment Dispersion Liquid 2)

A pigment dispersion liquid 2 having a pigment (solid solution pigment of C.I. Pigment Violet 19 and C.I. Pigment Red 122) content of 20.0% and a resin dispersant (Resin 1) content of 10.0% was prepared by the same procedure as that of the above-mentioned pigment dispersion liquid 1 except that the pigment was changed to solid solution pigment of C.I. Pigment Violet 19 and C.I. Pigment Red 122.

(Pigment Dispersion Liquid 3)

A pigment dispersion liquid 3 having a pigment (C.I. Pigment Red 150) content of 20.0% and a resin dispersant (Resin 1) content of 10.0% was prepared by the same procedure as that of the above-mentioned pigment dispersion liquid 1 except that the pigment was changed to C.I. Pigment Red 150.

(Pigment Dispersion Liquid 4)

A pigment dispersion liquid 4 having a pigment (C.I. Pigment Yellow 74) content of 20.0% and a resin dispersant (Resin 1) content of 10.0% was prepared by the same procedure as that of the above-mentioned pigment dispersion liquid 1 except that the pigment was changed to C.I. Pigment Yellow 74.

(Pigment Dispersion Liquid 5)

A pigment dispersion liquid S having a pigment (carbon black) content of 20.0% and a resin dispersant (Resin 1) content of 10.0% was prepared by the same procedure as that of the above-mentioned pigment dispersion liquid 1 except that the pigment was changed to carbon black.

(Pigment Dispersion Liquid 6)

An aqueous solution obtained by dissolving 5.0 g of concentrated hydrochloric acid in 5.5 g of ion-exchanged water was brought into the state of being cooled to 5° C., followed by the addition of 1.5 g of 4-aminophthalic acid to the solution. Next, a container containing the aqueous solution was loaded into an ice bath, and while the solution was stirred so that its temperature was held at 10° C. or less, a solution obtained by dissolving 0.9 g of sodium nitrite in 9.0 g of ion-exchanged water at 5° C. was added thereto. After the mixture had been stirred for 15 minutes, 6.0 g of pigment (carbon black) was added to the mixture under stirring and the whole was further stirred for 15 minutes to provide a slurry. The resultant slurry was filtered with filter paper (product name: "STANDARD FILTER PAPER No. 2," manufactured by Advantec), and particle remaining on the filter paper were sufficiently washed with water and dried in an oven at 110° C. After that, a sodium ion was substituted with a potassium ion by an ion exchange method. Thus, a self-dispersible pigment in which a $-C_6H_4-(COOK)_2$ group was bonded to the particle surface of the pigment was obtained. To this an appropriate amount of ion-exchanged water was added to obtain pigment dispersion liquid 6. The pigment (carbon black) content in pigment dispersion liquid 6 was 20.0%.

(Pigment Dispersion Liquid 7)

A pigment dispersion liquid 7 having a pigment (C.I. Pigment Blue 15:3) content of 20.0% was prepared by the same procedure as that of the above-mentioned pigment dispersion liquid 6 for self-dispersible pigment except that the pigment was changed to C.I. Pigment Blue 15:3.

<Preparation of Dispersants>

Nonionic dispersants 1 to 5 and anionic dispersants 1 to 3 described below were prepared as dispersants for dispersing waxes. The terms "EO number" and "PO number" in the following nonionic dispersants refer to the numbers of moles added (numbers of repeating units) of ethylene oxide and propylene oxide, respectively.

Nonionic dispersant 1: polyoxyethylene cetyl ether (EO number: 10)

Nonionic dispersant 2: polyoxyethylene cetyl ether (EO number: 20)

Nonionic dispersant 3: polyoxyethylene cetyl ether (EO number: 40)

Nonionic dispersant 4: polyoxyethylene oleyl ether (EO number: 20)

Nonionic dispersant 5: polyoxypropylene cetyl ether (PO number: 10)

Anionic dispersant 1: ethylene-acrylic acid copolymer having an acid value of 120 mgKOH/g and a weight-average molecular weight of 8,000

Anionic dispersant 2: ethylene-acrylic acid copolymer having an acid value of 160 mgKOH/g and a weight-average molecular weight of 8,000

Anionic dispersant 3: potassium montanate (Anionic Dispersants 1 and 2)

A copolymer formed of ethylene and acrylic acid was synthesized by an ordinary method and was neutralized with a neutralizer whose molar amount was equivalent to its acid value. In addition, ion-exchanged water was evaporated to dryness under reduced pressure. Thus, the solid anionic dispersant 1 and the solid anionic dispersant 2 were respectively obtained. The anionic dispersant 1 had an acid value of 120 mgKOH/g and a weight-average molecular weight of 8,000. In addition, the anionic dispersant 2 had an acid value of 160 mgKOH/g and a weight-average molecular weight of 8,000.

<Preparation of Water Dispersion Liquids of Wax Particles 1 to 23>

Respective components were mixed so that their usage amounts (unit: %) were as shown in Table 1, followed by appropriate adjustment of a temperature and a pressure to disperse waxes. Thus, wax-dispersed bodies each having a predetermined particle diameter were prepared. An appropriate amount of pure water was added to the dispersed bodies to prepare water dispersion liquids of wax particles 1 to 22 in each of which the total content of a wax and a dispersant was 35.00%. In Table 1, a wax having a branched structure was used as a "low-density polyethylene wax." In addition, a commercially available polyethylene oxide wax emulsion (product name: "AQUACER 513", manufactured by BYK-Chemie GmbH, content of a wax that did not satisfy any compound represented by the general formula (1) and a dispersant: 35.0% by mass, dispersed with a nonionic dispersant) was used as a water dispersion liquid of a wax particle 23. The polyethylene oxide wax emulsion is an aqueous dispersion containing no wax represented by the general formula (1). A total content (% by mass) of the wax and the dispersant in the water dispersion liquid of the wax particle 23 is 35.0% by mass. The water dispersion liquid of the wax particle 23 is the water dispersion liquid that the wax is dispersed with a nonionic dispersant.

TABLE 1

Preparation conditions of Water dispersion of wax particle

| Water dispersion of wax particle | Wax Type | Wax Amount used [%] | Nonionic dispersant Type | Nonionic dispersant Amount used [%] | Anionic dispersant Type | Anionic dispersant Amount used [%] |
|---|---|---|---|---|---|---|
| 1 | $C_{50}H_{102}$ | 29.00 | 1 | 5.00 | 1 | 1.00 |
| 2 | $C_{50}H_{102}$ | 29.00 | 2 | 5.00 | 1 | 1.00 |
| 3 | $C_{50}H_{102}$ | 29.00 | 3 | 5.00 | 1 | 1.00 |
| 4 | $C_{50}H_{102}$ | 29.00 | 4 | 5.00 | 1 | 1.00 |
| 5 | $C_{50}H_{102}$ | 29.00 | 1 | 5.00 | 2 | 1.00 |
| 6 | $C_{50}H_{102}$ | 25.00 | 1 | 5.00 | 1 | 5.00 |
| 7 | $C_{50}H_{102}$ | 27.00 | 1 | 7.00 | 1 | 1.00 |
| 8 | $C_{19}H_{40}$ | 29.00 | 1 | 5.00 | 1 | 1.00 |
| 9 | $C_{20}H_{42}$ | 29.00 | 1 | 5.00 | 1 | 1.00 |
| 10 | $C_{80}H_{162}$ | 29.00 | 1 | 5.00 | 1 | 1.00 |
| 11 | $C_{81}H_{164}$ | 29.00 | 1 | 5.00 | 1 | 1.00 |
| 12 | $C_{41}H_{84}$ | 29.00 | 1 | 5.00 | 1 | 1.00 |
| 13 | $C_{40}H_{82}$ | 29.00 | 1 | 5.00 | 1 | 1.00 |
| 14 | $C_{50}H_{102}$ | 30.00 | | 5.00 | | |
| 15 | $C_{50}H_{102}$ | 34.00 | | | 1 | 1.00 |
| 16 | $C_{50}H_{102}$ | 30.00 | 5 | 5.00 | | |
| 17 | $C_{50}H_{102}$ | 34.00 | | | 3 | 1.00 |
| 18 | $C_{50}H_{102}$ | 29.00 | 5 | 5.00 | 3 | 1.00 |
| 19 | $C_{50}H_{102}$ | 29.00 | 5 | 5.00 | 1 | 1.00 |
| 20 | $C_{50}H_{102}$ | 29.00 | 1 | 5.00 | 3 | 1.00 |
| 21 | $C_{20}H_{42}$ | 30.00 | 5 | 5.00 | | |
| 22 | Low-density polyethylene | 29.00 | 1 | 5.00 | 1 | 1.00 |

<Preparation of Ester Compounds>

Ester compounds 1 to 19 ach represented by the general formula (2) in which "a", "b" and "c" represented values shown in Table 2 were prepared. In addition, a compound represented by the following formula, the compound serving as a compound that did not satisfy the general formula (2), was used as an ester compound 20.

TABLE 2

Preparation of Ester compounds

| | General Formula (2) | | | a + b + 1 | a/b |
|---|---|---|---|---|---|
| | a | b | c | | |
| Ester compound 1 | 24 | 25 | 25 | 50 | 0.96 |
| Ester compound 2 | 9 | 10 | 25 | 20 | 0.90 |
| Ester compound 3 | 39 | 40 | 25 | 80 | 0.98 |
| Ester compound 4 | 9 | 9 | 25 | 19 | 1.00 |
| Ester compound 5 | 40 | 40 | 25 | 81 | 1.00 |
| Ester compound 6 | 0 | 19 | 25 | 20 | 0.00 |
| Ester compound 7 | 1 | 18 | 25 | 20 | 0.06 |
| Ester compound 8 | 24 | 25 | 9 | 50 | 0.96 |
| Ester compound 9 | 24 | 25 | 10 | 50 | 0.96 |
| Ester compound 10 | 24 | 25 | 40 | 50 | 0.96 |
| Ester compound 11 | 24 | 25 | 41 | 50 | 0.96 |
| Ester compound 12 | 11 | 12 | 25 | 24 | 0.92 |
| Ester compound 13 | 12 | 12 | 25 | 25 | 1.00 |
| Ester compound 14 | 37 | 37 | 25 | 75 | 1.00 |
| Ester compound 15 | 39 | 40 | 25 | 80 | 0.98 |
| Ester compound 16 | 24 | 55 | 25 | 80 | 0.44 |
| Ester compound 17 | 24 | 48 | 25 | 73 | 0.50 |
| Ester compound 18 | 24 | 16 | 25 | 41 | 1.50 |
| Ester compound 19 | 24 | 15 | 25 | 40 | 1.60 |

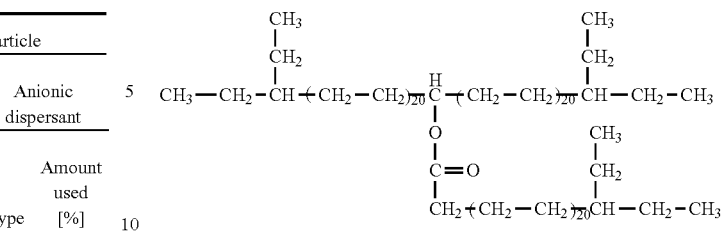

<Fatty Acids>

Fatty acids 1 to 5 each represented by the general formula (3) in which "d" represented a value shown in Table 3 were prepared.

TABLE 3

Preparation of Fatty acids

| | d in General formula (3) | Compound name |
|---|---|---|
| Fatty acid 1 | 25 | Hexacosanoic acid |
| Fatty acid 2 | 9 | Decanoic acid |
| Fatty acid 3 | 10 | Undecanoic acid |
| Fatty acid 4 | 40 | Hentetracontanoic acid |
| Fatty acid 5 | 41 | Dotetracontanoic acid |

<Preparation of Ink>

Respective components (unit: %) shown in the middle column of Table 4 (Table 4-1 to 4-6) were mixed and sufficiently stirred, followed by filtration with a cellulose acetate filter having a pore size of 3.0 μm (manufactured by Advantec) under pressure. Products whose numbers were shown in the upper sections of Tables 4 were used as a pigment dispersion liquid, a water dispersion liquid of a wax particle, an ester compound and a fatty acid. The term "ACETYLENOL E100" shown in Table 4 represents the product name of a surfactant manufactured by Kawaken Fine Chemicals Co., Ltd. In Table 4-1, in Example 2, 15.0% of the pigment dispersion liquid 2 and 5.0% of the pigment dispersion liquid 3 were used. Thus, a total of 20.0% pigment dispersion was used. The value of "(a+b+1)/n", which used "n" in the general formula (1) in the wax and "a" and "b" in the general formula (2) in the ester compound, was shown as an ink characteristic in the lower sections of Tables 4. In addition, the content W (%) of the wax, the content A (%) of the anionic dispersant, the content N (%) of the nonionic dispersant, the total content "W+X" (%) of the wax and the dispersants, the content Y (%) of the ester compound and the content Z (%) of the fatty acid in the ink, and the value of "(Y/(W+X))×100", the value of "Z/Y" and the value of "(Z/(W+X))×100" using these contents were shown.

TABLE 4-1

Composition and Property of Inks

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Type of pigment dispersion liquid | 1 | 2 + 3 | 4 | 5 | 6 | 7 | 1 | 1 | 1 | 1 | 1 |
| Type of wax particle | 1 | 1 | 1 | 1 | 1 | 1 | 2 | 3 | 4 | 5 | 6 |
| Type of ester compound | 1 | 1 | 1 | 1 | 1 | 1 | 1 | 1 | 1 | 1 | 1 |
| Type of fatty acid | 1 | 1 | 1 | 1 | 1 | 1 | 1 | 1 | 1 | 1 | 1 |
| Pigment dispersion liquid | 20.00 | 20.00 | 20.00 | 20.00 | 20.00 | 20.00 | 20.00 | 20.00 | 20.00 | 20.00 | 20.00 |
| Water dispersion of wax particle | 7.15 | 7.15 | 7.15 | 7.15 | 7.15 | 7.15 | 7.15 | 7.15 | 7.15 | 7.15 | 7.15 |
| Ester compound | 0.13 | 0.13 | 0.13 | 0.13 | 0.13 | 0.13 | 0.13 | 0.13 | 0.13 | 0.13 | 0.13 |
| Fatty acid | 0.06 | 0.06 | 0.06 | 0.06 | 0.06 | 0.06 | 0.06 | 0.06 | 0.06 | 0.06 | 0.06 |
| Glycerin | 5.00 | 5.00 | 5.00 | 5.00 | 5.00 | 5.00 | 5.00 | 5.00 | 5.00 | 5.00 | 5.00 |
| Triethyleneglycol | 5.00 | 5.00 | 5.00 | 5.00 | 5.00 | 5.00 | 5.00 | 5.00 | 5.00 | 5.00 | 5.00 |
| 1,2-Hexanediol | 3.00 | 3.00 | 3.00 | 3.00 | 3.00 | 3.00 | 3.00 | 3.00 | 3.00 | 3.00 | 3.00 |
| ACETYLENOL E100 | 1.00 | 1.00 | 1.00 | 1.00 | 1.00 | 1.00 | 1.00 | 1.00 | 1.00 | 1.00 | 1.00 |
| Ion-exchanged water | 58.66 | 58.66 | 58.66 | 58.66 | 58.66 | 58.66 | 58.66 | 58.66 | 58.66 | 58.66 | 58.66 |
| Content of wax W(%) | 2.07 | 2.07 | 2.07 | 2.07 | 2.07 | 2.07 | 2.07 | 2.07 | 2.07 | 2.07 | 1.79 |
| Content of nonionic dispersant N(%) | 0.36 | 0.36 | 0.36 | 0.36 | 0.36 | 0.36 | 0.36 | 0.36 | 0.36 | 0.36 | 0.36 |
| Content of anionic dispersant A(%) | 0.07 | 0.07 | 0.07 | 0.07 | 0.07 | 0.07 | 0.0 | 0.07 | 0.07 | 0.07 | 0.36 |
| Total content of wax and dispersant W + X(%) | 2.50 | 2.50 | 2.50 | 2.50 | 2.50 | 2.50 | 2.50 | 2.50 | 2.50 | 2.50 | 2.50 |
| Content of ester compound Y(%) | 0.13 | 0.13 | 0.13 | 0.13 | 0.13 | 0.13 | 0.13 | 0.13 | 0.13 | 0.13 | 0.13 |
| Content of fatty acid Z(%) | 0.06 | 0.06 | 0.06 | 0.06 | 0.06 | 0.00 | 0.06 | 0.06 | 0.06 | 0.06 | 0.06 |
| $(a + b + 1)/n$ | 1.00 | 1.00 | 1.00 | 1.00 | 1.00 | 1.00 | 1.00 | 1.00 | 1.00 | 1.00 | 1.00 |
| $(Y/X) \times 100$ | 5.20 | 5.20 | 5.20 | 5.20 | 5.20 | 5.20 | 5.20 | 5.20 | 5.20 | 5.20 | 5.20 |
| Z/Y | 0.46 | 0.46 | 0.46 | 0.46 | 0.46 | 0.46 | 0.46 | 0.46 | 0.46 | 0.46 | 0.46 |
| $(Z/X) \times 100$ | 2.40 | 2.40 | 2.40 | 2.40 | 2.40 | 2.40 | 2.40 | 2.40 | 2.40 | 2.40 | 2.40 |

TABLE 4-2

Composition and Property of Inks

| | Example | | | | | | | | | | |
|---|---|---|---|---|---|---|---|---|---|---|---|
| | 12 | 13 | 14 | 15 | 16 | 17 | 18 | 19 | 20 | 21 | 22 |
| Type of pigment dispersion liquid | 1 | 1 | 1 | 1 | 1 | 1 | 1 | 1 | 1 | 1 | 1 |
| Type of wax particle | 7 | 9 | 10 | 1 | 1 | 1 | 1 | 1 | 1 | 9 | 10 |
| Type of ester compound | 1 | 2 | 3 | 9 | 10 | 12 | 13 | 14 | 15 | 7 | 16 |
| Type of fatty acid | 1 | 1 | 1 | 1 | 1 | 1 | 1 | 1 | 1 | 1 | 1 |
| Pigment dispersion liquid | 20.00 | 20.00 | 20.00 | 20.00 | 20.00 | 20.00 | 20.00 | 20.00 | 20.00 | 20.00 | 20.00 |
| Water dispersion of wax particle | 7.15 | 7.15 | 7.15 | 7.15 | 7.15 | 7.15 | 7.15 | 7.15 | 7.15 | 7.15 | 7.15 |
| Ester compound | 0.13 | 0.13 | 0.13 | 0.13 | 0.13 | 0.13 | 0.13 | 0.13 | 0.13 | 0.13 | 0.13 |
| Fatty acid | 0.06 | 0.06 | 0.06 | 0.06 | 0.06 | 0.06 | 0.06 | 0.06 | 0.06 | 0.06 | 0.06 |
| Glycerin | 5.00 | 5.00 | 5.00 | 5.00 | 5.00 | 5.00 | 5.00 | 5.00 | 5.00 | 5.00 | 5.00 |
| Triethyleneglycol | 5.00 | 5.00 | 5.00 | 5.00 | 5.00 | 5.00 | 5.00 | 5.00 | 5.00 | 5.00 | 5.00 |
| 1,2-Hexanediol | 3.00 | 3.00 | 3.00 | 3.00 | 3.00 | 3.00 | 3.00 | 3.00 | 3.00 | 3.00 | 3.00 |
| ACETYLENOL E100 | 1.00 | 1.00 | 1.00 | 1.00 | 1.00 | 1.00 | 1.00 | 1.00 | 1.00 | 1.00 | 1.00 |
| Ion-exchanged water | 58.66 | 58.66 | 58.66 | 58.66 | 58.66 | 58.66 | 58.66 | 58.66 | 58.66 | 58.66 | 58.66 |
| Content of wax W(%) | 1.93 | 2.07 | 2.07 | 2.07 | 2.07 | 2.07 | 2.07 | 2.07 | 2.07 | 2.07 | 2.07 |
| Content of nonionic dispersant N(%) | 0.50 | 0.36 | 0.36 | 0.36 | 0.36 | 0.36 | 0.36 | 0.36 | 0.36 | 0.36 | 0.36 |
| Content of anionic dispersant A(%) | 0.07 | 0.07 | 0.07 | 0.07 | 0.07 | 0.07 | 0.07 | 0.07 | 0.07 | 0.07 | 0.07 |
| Total content of wax and dispersant W + X(%) | 2.50 | 2.50 | 2.50 | 2.50 | 2.50 | 2.50 | 2.50 | 2.50 | 2.50 | 2.50 | 2.50 |
| Content of ester compound Y(%) | 0.13 | 0.13 | 0.13 | 0.13 | 0.13 | 0.13 | 0.13 | 0.13 | 0.13 | 0.13 | 0.13 |
| Content of fatty acid Z(%) | 0.06 | 0.06 | 0.06 | 0.06 | 0.06 | 0.06 | 0.06 | 0.06 | 0.06 | 0.06 | 0.00 |
| $(a + b + 1)/n$ | 1.00 | 1.00 | 1.00 | 1.00 | 1.00 | 0.48 | 0.50 | 1.50 | 1.60 | 1.00 | 1.00 |
| $(Y/X) \times 100$ | 5.20 | 5.20 | 5.20 | 5.20 | 5.20 | 5.20 | 5.20 | 5.20 | 5.20 | 5.20 | 5.20 |

TABLE 4-2-continued

Composition and Property of Inks

| | Example | | | | | | | | | | |
|---|---|---|---|---|---|---|---|---|---|---|---|
| | 12 | 13 | 14 | 15 | 16 | 17 | 18 | 19 | 20 | 21 | 22 |
| Z/Y | 0.46 | 0.46 | 0.46 | 0.46 | 0.46 | 0.46 | 0.46 | 0.46 | 0.46 | 0.46 | 0.46 |
| (Z/X) × 100 | 2.40 | 2.40 | 2.40 | 2.40 | 2.40 | 2.40 | 2.40 | 2.40 | 2.40 | 2.40 | 2.40 |

TABLE 4-3

Composition and Property of Inks

| | Example | | | | | | | | | | |
|---|---|---|---|---|---|---|---|---|---|---|---|
| | 23 | 24 | 25 | 26 | 27 | 28 | 29 | 30 | 31 | 32 | 33 |
| Type of pigment dispersion liquid | 1 | 1 | 1 | 1 | 1 | 1 | 1 | 1 | 1 | 1 | 1 |
| Type of wax particle | 1 | 12 | 1 | 1 | 1 | 1 | 1 | 1 | 1 | 1 | 1 |
| Type of ester compound | 17 | 18 | 19 | 1 | 1 | 1 | 1 | 1 | 1 | 1 | 1 |
| Type of fatty acid | 1 | 1 | 1 | 1 | 1 | 1 | 1 | 2 | 3 | 4 | 5 |
| Pigment dispersion liquid | 20.00 | 20.00 | 20.00 | 20.00 | 20.00 | 20.00 | 20.00 | 20.00 | 20.00 | 20.00 | 20.00 |
| Water dispersion of wax particle | 7.15 | 7.15 | 7.15 | 7.15 | 7.15 | 7.15 | 7.15 | 7.15 | 7.15 | 7.15 | 7.15 |
| Ester compound | 0.13 | 0.13 | 0.13 | 0.008 | 0.01 | 0.30 | 0.31 | 0.13 | 0.13 | 0.13 | 0.13 |
| Fatty acid | 0.06 | 0.06 | 0.06 | 0.006 | 0.006 | 0.10 | 0.10 | 0.06 | 0.06 | 0.06 | 0.06 |
| Glycerin | 5.00 | 5.00 | 5.00 | 5.00 | 5.00 | 5.00 | 5.00 | 5.00 | 5.00 | 5.00 | 5.00 |
| Triethyleneglycol | 5.00 | 5.00 | 5.00 | 5.00 | 5.00 | 5.00 | 5.00 | 5.00 | 5.00 | 5.00 | 5.00 |
| 1,2-Hexanediol | 3.00 | 3.00 | 3.00 | 3.00 | 3.00 | 3.00 | 3.00 | 3.00 | 3.00 | 3.00 | 3.00 |
| ACETYLENOL E100 | 1.00 | 1.00 | 1.00 | 1.00 | 1.00 | 1.00 | 1.00 | 1.00 | 1.00 | 1.00 | 1.00 |
| Ion-exchanged water | 58.66 | 58.66 | 58.66 | 58.836 | 58.834 | 58.45 | 58.44 | 58.66 | 58.66 | 58.66 | 58.66 |
| Content of wax W(%) | 2.07 | 2.07 | 2.07 | 2.07 | 2.07 | 2.07 | 2.07 | 2.07 | 2.07 | 2.07 | 2.07 |
| Content of nonionic dispersant N(%) | 0.36 | 0.36 | 0.36 | 0.36 | 0.36 | 0.36 | 0.36 | 0.36 | 0.36 | 0.36 | 0.36 |
| Content of anionic dispersant A(%) | 0.07 | 0.07 | 0.07 | 0.07 | 0.07 | 0.07 | 0.07 | 0.07 | 0.07 | 0.07 | 0.07 |
| Total content of wax and dispersant W + X(%) | 2.50 | 2.50 | 2.50 | 2.50 | 2.50 | 2.50 | 2.50 | 2.50 | 2.50 | 2.50 | 2.50 |
| Content of ester compound Y(%) | 0.13 | 0.13 | 0.13 | 0.008 | 0.01 | 0.30 | 0.31 | 0.13 | 0.13 | 0.13 | 0.13 |
| Content of fatty acid Z(%) | 0.06 | 0.06 | 0.06 | 0.006 | 0.006 | 0.10 | 0.10 | 0.06 | 0.06 | 0.06 | 0.06 |
| (a + b + 1)/n | 1.46 | 1.00 | 1.00 | 1.00 | 1.00 | 1.00 | 1.00 | 1.00 | 1.00 | 1.00 | 1.00 |
| (Y/X) × 100 | 5.20 | 5.20 | 5.20 | 0.32 | 0.40 | 12.00 | 12.40 | 5.20 | 5.20 | 5.20 | 5.20 |
| Z/Y | 0.46 | 0.46 | 0.46 | 0.75 | 0.60 | 0.33 | 0.32 | 0.46 | 0.46 | 0.46 | 0.46 |
| (Z/X) × 100 | 2.40 | 2.40 | 2.40 | 0.24 | 0.24 | 4.00 | 4.00 | 2.40 | 2.40 | 2.40 | 2.40 |

TABLE 4-4

Composition and Property of Inks

| | Example | | | | | | | | | | |
|---|---|---|---|---|---|---|---|---|---|---|---|
| | 34 | 35 | 36 | 37 | 38 | 39 | 40 | 41 | 42 | 43 | 44 |
| Type of pigment dispersion liquid | 1 | 1 | 1 | 1 | 1 | 1 | 1 | 1 | 1 | 1 | 1 |
| Type of wax particle | 1 | 1 | 1 | 1 | 1 | 1 | 1 | 1 | 1 | 14 | 15 |
| Type of ester compound | 1 | 1 | 1 | 1 | 1 | 1 | 1 | 1 | 1 | 1 | 1 |
| Type of fatty acid | — | 1 | 1 | 1 | 1 | 1 | 1 | 1 | 1 | 1 | 1 |
| Pigment dispersion liquid | 20.00 | 20.00 | 20.00 | 20.00 | 20.00 | 20.00 | 20.00 | 20.00 | 20.00 | 20.00 | 20.00 |
| Water dispersion of wax particle | 7.15 | 7.15 | 7.15 | 7.15 | 7.15 | 7.15 | 7.15 | 3.45 | 7.20 | 7.15 | 7.15 |
| Ester compound | 0.13 | 0.13 | 0.13 | 0.13 | 0.13 | 0.01 | 0.01 | 0.13 | 0.30 | 0.13 | 0.13 |
| Fatty acid | | 0.02 | 0.03 | 0.10 | 0.11 | 0.004 | 0.005 | 0.10 | 0.21 | 0.06 | 0.06 |
| Glycerin | 5.00 | 5.00 | 5.00 | 5.00 | 5.00 | 5.00 | 5.00 | 5.00 | 5.00 | 5.00 | 5.00 |
| Triethyleneglycol | 5.00 | 5.00 | 5.00 | 5.00 | 5.00 | 5.00 | 5.00 | 5.00 | 5.00 | 5.00 | 5.00 |
| 1,2-Hexanediol | 3.00 | 3.00 | 3.00 | 3.00 | 3.00 | 3.00 | 3.00 | 3.00 | 3.00 | 3.00 | 3.00 |
| ACETYLENOL E100 | 1.00 | 1.00 | 1.00 | 1.00 | 1.00 | 1.00 | 1.00 | 1.00 | 1.00 | 1.00 | 1.00 |

TABLE 4-4-continued

Composition and Property of Inks

| | Example | | | | | | | | | | |
|---|---|---|---|---|---|---|---|---|---|---|---|
| | 34 | 35 | 36 | 37 | 38 | 39 | 40 | 41 | 42 | 43 | 44 |
| Ion-exchanged water | 58.72 | 58.70 | 58.69 | 58.62 | 58.61 | 58.836 | 58.835 | 62.32 | 58.29 | 58.66 | 58.66 |
| Content of wax W(%) | 2.07 | 2.07 | 2.07 | 2.07 | 2.07 | 2.07 | 2.07 | 1.00 | 2.09 | 2.15 | 2.43 |
| Content of nonionic dispersant N(%) | 0.36 | 0.36 | 0.36 | 0.36 | 0.36 | 0.36 | 0.36 | 0.17 | 0.36 | 0.36 | 0.00 |
| Content of anionic dispersant A(%) | 0.07 | 0.07 | 0.07 | 0.07 | 0.07 | 0.07 | 0.07 | 0.03 | 0.07 | 0.00 | 0.07 |
| Total content of wax and dispersant W + X(%) | 2.50 | 2.50 | 2.50 | 2.50 | 2.50 | 2.50 | 2.50 | 1.21 | 2.52 | 2.50 | 2.50 |
| Content of ester compound Y(%) | 0.13 | 0.13 | 0.13 | 0.13 | 0.13 | 0.01 | 0.01 | 0.13 | 0.30 | 0.13 | 0.13 |
| Content of fatty acid Z(%) | 0.00 | 0.02 | 0.03 | 0.10 | 0.11 | 0.004 | 0.005 | 0.10 | 0.21 | 0.06 | 0.06 |
| $(a + b + 1)/n$ | 1.00 | 1.00 | 1.00 | 1.00 | 1.00 | 1.00 | 1.00 | 1.00 | 1.00 | 1.00 | 1.00 |
| $(Y/X) \times 100$ | 5.20 | 5.20 | 5.20 | 5.20 | 5.20 | 0.40 | 0.40 | 10.74 | 11.90 | 5.20 | 5.20 |
| ZY | 0.00 | 0.15 | 0.23 | 0.77 | 0.85 | 0.40 | 0.50 | 0.77 | 0.70 | 0.46 | 0.46 |
| $(Z/X) \times 100$ | 0.00 | 0.80 | 1.20 | 4.00 | 4.40 | 0.16 | 0.20 | 8.26 | 8.33 | 2.40 | 2.40 |

TABLE 4-5

Composition and Property of Inks

| | Example | | | | | | | | | | Comparative example 1 |
|---|---|---|---|---|---|---|---|---|---|---|---|
| | 45 | 46 | 47 | 48 | 49 | 50 | 51 | 52 | 53 | 54 | |
| Type of pigment dispersion liquid | 1 | 1 | 1 | 1 | 1 | 1 | 1 | 1 | 1 | 1 | 1 |
| Type of wax particle | 16 | 17 | 18 | 19 | 20 | 1 | 1 | 1 | 1 | 21 | — |
| Type of ester compound | 1 | 1 | 1 | 1 | 1 | 1 | 1 | 1 | 1 | 16 | 1 |
| Type of fatty acid | 1 | 1 | 1 | 1 | 1 | 1 | 1 | 1 | 1 | — | 1 |
| Pigment dispersion liquid | 20.00 | 20.00 | 20.00 | 20.00 | 20.00 | 20.00 | 20.00 | 20.00 | 20.00 | 20.00 | 20.00 |
| Water dispersion of wax particle | 7.15 | 7.15 | 7.15 | 7.15 | 7.15 | 1.14 | 1.43 | 25.70 | 26.00 | 1.14 | |
| Ester compound | 0.13 | 0.13 | 0.13 | 0.13 | 0.13 | 0.02 | 0.03 | 0.47 | 0.47 | 0.05 | 0.13 |
| Fatty acid | 0.06 | 0.06 | 0.06 | 0.06 | 0.06 | 0.01 | 0.01 | 0.20 | 0.20 | | 0.06 |
| Glycerin | 5.00 | 5.00 | 5.00 | 5.00 | 5.00 | 5.00 | 5.00 | 5.00 | 5.00 | 5.00 | 5.00 |
| Triethyleneglycol | 5.00 | 5.00 | 5.00 | 5.00 | 5.00 | 5.00 | 5.00 | 5.00 | 5.00 | 5.00 | 5.00 |
| 1,2-Hexanediol | 3.00 | 3.00 | 3.00 | 3.00 | 3.00 | 3.00 | 3.00 | 3.00 | 3.00 | 3.00 | 3.00 |
| ACETYLENOL E100 | 1.00 | 1.00 | 1.00 | 1.00 | 1.00 | 1.00 | 1.00 | 1.00 | 1.00 | 1.00 | 1.00 |
| Ion-exchanged water | 58.66 | 58.66 | 58.66 | 58.66 | 58.66 | 64.83 | 64.53 | 39.63 | 39.33 | 64.81 | 65.81 |
| Content of wax W(%) | 2.15 | 2.43 | 2.07 | 2.07 | 2.07 | 0.33 | 0.41 | 7.45 | 7.54 | 0.34 | 0.00 |
| Content of nonionic dispersant N(%) | 0.36 | 0.00 | 0.36 | 0.36 | 0.36 | 0.06 | 0.07 | 1.29 | 1.30 | 0.06 | 0.00 |
| Content of anionic dispersant A(%) | 0.00 | 0.07 | 0.07 | 0.07 | 0.0 | 0.01 | 0.01 | 0.26 | 0.26 | 0.00 | 0.00 |
| Total content of wax and dispersant W + X(%) | 2.50 | 2.50 | 2.50 | 2.50 | 2.50 | 0.40 | 0.50 | 9.00 | 9.10 | 0.40 | 0.00 |
| Content of ester compound Y(%) | 0.13 | 0.13 | 0.13 | 0.13 | 0.13 | 0.02 | 0.03 | 0.47 | 0.47 | 0.05 | 0.13 |
| Content of fatty acid Z(%) | 0.06 | 0.06 | 0.06 | 0.06 | 0.06 | 0.01 | 0.01 | 0.20 | 0.20 | 0.00 | 0.06 |
| $(a + b + 1)/n$ | 1.00 | 1.00 | 1.00 | 1.00 | 1.00 | 1.00 | 1.00 | 1.00 | 1.00 | 4.00 | — |
| $(Y/X) \times 100$ | 5.20 | 5.20 | 5.20 | 5.20 | 5.20 | 5.00 | 6.00 | 5.22 | 5.16 | 12.50 | — |
| Z/Y | 0.46 | 0.46 | 0.46 | 0.46 | 0.46 | 0.50 | 0.33 | 0.43 | 0.43 | 0.00 | 0.46 |
| $(Z/X) \times 100$ | 2.40 | 2.40 | 2.40 | 2.40 | 2.40 | 2.50 | 2.00 | 2.22 | 2.20 | 0.00 | — |

TABLE 4-6

Composition and Property of Inks

| | Comparative example | | | | | | | | | | |
|---|---|---|---|---|---|---|---|---|---|---|---|
| | 2 | 3 | 4 | 5 | 6 | 7 | 8 | 9 | 10 | 11 | 12 |
| Type of pigment dispersion liquid | 1 | 1 | 1 | 1 | 1 | 1 | 3 | 1 | 1 | 1 | 1 |
| Type of wax particle | 1 | 8 | 11 | 9 | 10 | 9 | 1 | 1 | 22 | 23 | 1 |
| Type of ester compound | — | 2 | 3 | 4 | 5 | 6 | 8 | 11 | 3 | 1 | 20 |
| Type of fatty acid | 1 | 1 | 1 | 1 | 1 | 1 | 1 | 1 | 1 | 1 | 1 |
| Pigment dispersion liquid | 20.00 | 20.00 | 20.00 | 20.00 | 20.00 | 20.00 | 20.00 | 20.00 | 20.00 | 20.00 | 20.00 |
| Water dispersion of wax particle | 7.15 | 7.15 | 7.15 | 7.15 | 7.15 | 7.15 | 7.15 | 7.15 | 7.15 | 7.15 | 7.15 |
| Ester compound | | 0.13 | 0.13 | 0.13 | 0.13 | 0.13 | 0.13 | 0.13 | 0.13 | 0.13 | 0.13 |
| Fatty acid | 0.06 | 0.06 | 0.06 | 0.06 | 0.06 | 0.06 | 0.06 | 0.06 | 0.06 | 0.06 | 0.06 |
| Glycerin | 5.00 | 5.00 | 5.00 | 5.00 | 5.00 | 5.00 | 5.00 | 5.00 | 5.00 | 5.00 | 5.00 |
| Triethyleneglycol | 5.00 | 5.00 | 5.00 | 5.00 | 5.00 | 5.00 | 5.00 | 5.00 | 5.00 | 5.00 | 5.00 |
| 1,2-Hexanediol | 3.00 | 3.00 | 3.00 | 3.00 | 3.00 | 3.00 | 3.00 | 3.00 | 3.00 | 3.00 | 3.00 |
| ACETYLENOL E100 | 1.00 | 1.00 | 1.00 | 1.00 | 1.00 | 1.00 | 1.00 | 1.00 | 1.00 | 1.00 | 1.00 |
| Ion-exchanged water | 58.79 | 58.66 | 58.66 | 58.66 | 58.66 | 58.66 | 58.66 | 58.66 | 58.66 | 58.66 | 58.66 |
| Content of wax W(%) | 2.07 | 2.07 | 2.07 | 2.07 | 2.07 | 2.07 | 2.07 | 2.07 | 2.07 | — | 2.07 |
| Content of nonionic dispersant N(%) | 0.36 | 0.36 | 0.36 | 0.36 | 0.36 | 0.36 | 0.36 | 0.36 | 0.36 | — | 0.36 |
| Content of anionic dispersant A(%) | 0.07 | 0.07 | 0.07 | 0.07 | 0.07 | 0.07 | 0.07 | 0.07 | 0.07 | — | 0.07 |
| Total content of wax and dispersant W + X(%) | 2.50 | 2.50 | 2.50 | 2.50 | 2.50 | 2.50 | 2.50 | 2.50 | 2.50 | 2.50 | 2.50 |
| Content of ester compound Y(%) | 0.00 | 0.13 | 0.13 | 0.13 | 0.13 | 0.13 | 0.13 | 0.13 | 0.13 | 0.13 | 0.13 |
| Content of fatty acid Z(%) | 0.06 | 0.06 | 0.06 | 0.06 | 0.06 | 0.06 | 0.06 | 0.06 | 0.06 | 0.0 | 0.06 |
| (a + b + 1)/n | — | 1.05 | 0.99 | 0.95 | 1.01 | 1.00 | 1.00 | 1.00 | — | — | — |
| (Y/X) × 100 | 0.00 | 5.20 | 5.20 | 5.20 | 5.20 | 5.20 | 5.20 | 5.20 | 5.20 | 5.20 | 5.20 |
| Z/Y | — | 0.46 | 0.46 | 0.46 | 0.46 | 0.46 | 0.46 | 0.46 | 0.46 | 0.46 | 0.46 |
| (Z/X) × 100 | 2.40 | 2.40 | 2.40 | 2.40 | 2.40 | 2.40 | 2.40 | 2.40 | 2.40 | 2.40 | 2.40 |

<Evaluation>

The inks were each loaded into the ink jet recording apparatus 100 having a configuration illustrated in FIG. 1. A solid image measuring 1.5 cm by 13 cm was recorded on a recording medium with the ink jet recording apparatus 100 while the application amount of the ink was set to 8 g/m². Coated paper (product name: "OK TOP COAT+", manufactured by Oji Paper Co., Ltd.) was used as the recording medium. In this Example, in evaluation criteria for each of the following items, while levels "AA", "A" and "B" were defined as acceptable levels, a level "C" was defined as an unacceptable level. The evaluation results are shown in Table 5.

(Abrasion Resistance)

The recorded image was placed under an environment at 25° C. and a relative humidity of 55% for 24 hours. After that, the image was rubbed with a gakushin-type friction tester II (product name: "AB-301", manufactured by Tester Sangyo Co., Ltd.) in conformity with JIS L 0849 at a load of 200 g once. A recording medium of the same kind as that of the recording medium having recorded thereon the image was bonded as evaluation recording paper to a friction block portion. The surface of the image and the surface of the evaluation recording paper after the friction test were visually observed, followed by the evaluation of the abrasion resistance of the image in accordance with the following evaluation criteria.

A: The image was fixed to the recording medium to preclude the observation of the white ground of the recording medium and no contamination was present on the evaluation recording paper.
  B: The image was fixed to the recording medium to preclude the observation of the white ground of the recording medium but contamination was present on the evaluation recording paper.
  C: The image peeled from the recording medium to show the white ground of the recording medium.

(Storage Stability)

70 Grams of each of the produced inks was loaded into a glass bottle having a volume of 100 mL (Vials With Screw Cap/SV-100, NICHIDEN-RIKA GLASS CO., LTD.) and was left to stand still under each of room temperature (25° C.) and environments at 40° C. and 60° C. for 14 days. After that, the surface of the ink in the glass bottle was visually observed and the storage stability of the ink was evaluated in accordance with the following evaluation criteria.

AA: Neither the floating of the wax nor layer separation was present on the surface of the ink after each of the still standing at room temperature and the still standing under each of the environments at 40° C. and 60° C.
  A: Although neither the floating of the wax nor the layer separation was present on the surface of the ink after each of the still standing at room temperature and the still standing under the environment at 40° C., the floating of the wax and the layer separation were observed on the surface of the ink after the still standing under the environment at 60° C.
  B: Although neither the floating of the wax nor the layer separation was present on the surface of the ink after the still standing at room temperature, the floating of the wax and the layer separation were observed on the surface of the ink after the still standing under each of the environments at 40° C. and 60° C.
  C: The floating of the wax and the layer separation were observed on the surface of the ink after each of the still standing at room temperature and the still standing under each of the environments at 40° C. and 60° C.

TABLE 5

| | | Evaluation result | |
|---|---|---|---|
| | | Abrasion resistance | Preservation stability |
| Example | 1 | A | AA |
| | 2 | A | AA |
| | 3 | A | AA |
| | 4 | A | AA |
| | 5 | A | AA |
| | 6 | A | AA |
| | 7 | A | AA |
| | 8 | A | AA |
| | 9 | A | AA |
| | 10 | A | AA |
| | 11 | A | AA |
| | 12 | A | AA |
| | 13 | B | AA |
| | 14 | A | AA |
| | 15 | A | AA |
| | 16 | A | AA |
| | 17 | A | A |
| | 18 | A | AA |
| | 19 | A | AA |
| | 20 | A | A |
| | 21 | B | A |
| | 22 | A | A |
| | 23 | A | AA |
| | 24 | A | AA |
| | 25 | A | A |
| | 26 | A | A |
| | 27 | A | AA |
| | 28 | A | AA |
| | 29 | A | A |
| | 30 | A | A |
| | 31 | A | AA |
| | 32 | A | AA |
| | 33 | A | A |
| Example | 34 | A | B |
| | 35 | A | A |
| | 36 | A | AA |
| | 37 | A | AA |
| | 38 | A | A |
| | 39 | A | A |
| | 40 | A | AA |
| | 41 | A | AA |
| | 42 | A | A |
| | 43 | A | A |
| | 44 | A | A |
| | 45 | A | B |
| | 46 | A | B |
| | 47 | A | A |
| | 48 | A | A |
| | 49 | A | A |
| | 50 | B | AA |
| | 51 | A | AA |
| | 52 | A | AA |
| | 53 | A | A |
| | 54 | B | B |
| Comparative | 1 | C | AA |
| Example | 2 | A | C |
| | 3 | C | AA |
| | 4 | A | C |
| | 5 | B | C |
| | 6 | A | C |
| | 7 | B | C |
| | 8 | A | C |
| | 9 | A | C |
| | 10 | A | C |
| | 11 | A | C |
| | 12 | A | C |

Although the evaluation result of the storage stability of each of Examples 48 and 49 was "A", which was the same as that of Example 47, Example 48 and Example 49 were superior to Example 47.

In addition, as Example 55, an image was recorded with the ink of Example 1 except that uncoated paper (product name: "OK PRINCE HIGH QUALITY", manufactured by Oji Paper Co., Ltd.) was used as a recording medium, followed by the performance of the above-mentioned evaluations. As a result, the evaluation results of the abrasion resistance and the storage stability were "A" and "AA", respectively, which were the same as those of Example 1.

According to the present disclosure, there can be provided the aqueous ink that can record an image with good abrasion resistance and good storage stability. In addition, according to the present disclosure, the ink jet recording method and the ink jet recording apparatus using the aqueous ink can be provided.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-167231, filed Oct. 18, 2022, and Japanese Patent Application No. 2023-160081, filed Sep. 25, 2023, which are hereby incorporated by reference herein in their entirety.

What is claimed is:

1. An aqueous ink for ink jet comprising:
a wax;
a dispersant for dispersing the wax;
an ester compound; and
a water-soluble organic solvent,
wherein the wax is a wax represented by the following general formula (1), and
wherein the ester compound is an ester compound represented by the following general formula (2):

$$C_nH_{2n+2} \quad (1)$$

in the general formula (1), "n" represents an integer of 20 or more to 80 or less;

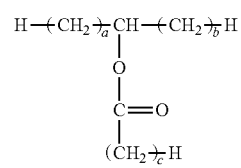

in the general formula (2), "a" and "b" each independently represent an integer of 1 or more, the integers satisfying $20 \leq a+b+1 \leq 80$, and "c" represents an integer of 10 or more to 40 or less.

2. The aqueous ink according to claim 1, wherein the wax represented by the general formula (1) and the ester compound represented by the general formula (2) satisfy a relationship of $0.50 \leq (a+b+1)/n \leq 1.50$ between "n" in the general formula (1) and "a" and "b" in the general formula (2).

3. The aqueous ink according to claim 1, wherein "a" and "b" in the general formula (2) satisfy a relationship of $0.50 \leq a/b \leq 1.50$.

4. The aqueous ink according to claim 1, wherein a content W (% by mass) of the wax in the aqueous ink, a content X (% by mass) of the dispersant therein and a content Y (% by mass) of the ester compound therein satisfy a relationship of $0.40 \leq (Y/(W+X)) \times 100 \leq 12.00$.

5. The aqueous ink according to claim 1, further comprising a fatty acid represented by the following general formula (3):

(3)

in the general formula (3), "d" represents an integer of 10 or more to 40 or less.

6. The aqueous ink according to claim 5, wherein a content Y (% by mass) of the ester compound in the aqueous ink and a content Z (% by mass) of the fatty acid therein satisfy a relationship of $0.20 \leq Z/Y \leq 0.80$.

7. The aqueous ink according to claim 5, wherein a content W (% by mass) of the wax in the aqueous ink, a content X (% by mass) of the dispersant therein and a content Z (% by mass) of the fatty acid therein satisfy a relationship of $0.20 \leq (Z/(W+X)) \times 100 \leq 8.30$.

8. The aqueous ink according to claim 1, wherein the dispersant comprises a nonionic dispersant and an anionic dispersant.

9. The aqueous ink according to claim 8, wherein the nonionic dispersant of the wax particle is a polyoxyethylene alkyl ether-based dispersant or a polyoxyethylene alkenyl ether-based dispersant.

10. The aqueous ink according to claim 8, wherein the anionic dispersant of the wax particle is an ethylene-acrylic acid copolymer.

11. The aqueous ink according to claim 1, wherein a total content (% by mass) of the wax and the dispersant is 0.50% by mass or more to 9.00% by mass or less with respect to a total mass of the ink.

12. The aqueous ink according to claim 1, wherein "n" in the general formula (1) represents 40 or more to 80 or less.

13. An ink jet recording method of recording an image onto a recording medium by ejecting an ink from an ink jet recording head, wherein the ink comprises the aqueous ink of claim 1.

14. An ink jet recording apparatus comprising:
an ink; and
a recording head of an ink jet system configured to eject the ink,
wherein the ink comprises the aqueous ink of claim 1.

* * * * *